(12) United States Patent
Tay

(10) Patent No.: US 9,065,999 B2
(45) Date of Patent: Jun. 23, 2015

(54) METHOD AND APPARATUS FOR EVALUATING SHARPNESS OF IMAGE

(76) Inventor: Hiok Nam Tay, Singapore (SG)

(*) Notice: Subject to any disclaimer, the term of this patent is extended or adjusted under 35 U.S.C. 154(b) by 0 days.

(21) Appl. No.: 13/430,684

(22) Filed: Mar. 26, 2012

(65) Prior Publication Data

US 2012/0242856 A1 Sep. 27, 2012

Related U.S. Application Data

(63) Continuation-in-part of application No. PCT/IB2011/052524, filed on Jun. 9, 2011.

(60) Provisional application No. 61/467,379, filed on Mar. 24, 2011.

(51) Int. Cl.
*H04N 5/232* (2006.01)
*G01S 3/782* (2006.01)
*G01S 3/786* (2006.01)
*G02B 7/36* (2006.01)

(52) U.S. Cl.
CPC .............. *H04N 5/23212* (2013.01); *G02B 7/36* (2013.01); *G01S 3/782* (2013.01); *G01S 3/7864* (2013.01)

(58) Field of Classification Search
USPC ...................... 348/222.1, 239, 252, 345–357; 382/199, 203, 209, 217, 255, 266
See application file for complete search history.

(56) References Cited

U.S. PATENT DOCUMENTS

| 4,652,931 | A |   | 3/1987 | Okudaira et al. |
| 4,694,151 | A |   | 9/1987 | Yoshimura |
| 5,040,228 | A |   | 8/1991 | Bose |
| 5,396,336 | A |   | 3/1995 | Yoshii et al. |
| 5,496,106 | A |   | 3/1996 | Anderson |
| 5,729,290 | A |   | 3/1998 | Tokumitsu et al. |
| 5,790,710 | A |   | 8/1998 | Price et al. |
| 5,875,040 | A |   | 2/1999 | Matraszek |
| 5,880,455 | A |   | 3/1999 | Otaki et al. |
| 6,023,056 | A | * | 2/2000 | Fiete et al. ................. 250/201.7 |

(Continued)

FOREIGN PATENT DOCUMENTS

| EP | 0552016 A2 | 7/1993 |
| EP | 0926526 A2 | 6/1999 |

(Continued)

OTHER PUBLICATIONS

PCT/IB2011/052524 Internal Search Report.

(Continued)

*Primary Examiner* — Roberto Velez
*Assistant Examiner* — Quan Pham

(57) ABSTRACT

An auto focus image system that includes a pixel array coupled to a focus signal generator. The pixel array captures an image that has a plurality of edges. The generator generates a focus signal that is a function of a plurality of edge-sharpness measures for the plurality of edges. The generator compares a sequence of gradients across the edge with one or more reference sequences of gradients and/or reference curves defined by data retrieved from a non-volatile memory. The generator may reject or de-emphasize the edge using result of the comparison. The edge sharpness measure is a quantity whose unit is a positive or negative, integer or non-integer power of a unit of length. It may be measured from the edge and/or a reference sequence/curve matched to the edge, or may be retrieved for the matched reference sequence/curve from a non-volatile memory.

4 Claims, 22 Drawing Sheets

(56) References Cited

U.S. PATENT DOCUMENTS

| | | | |
|---|---|---|---|
| 6,094,508 A | 7/2000 | Acharya | |
| 6,337,925 B1 | 1/2002 | Cohen | |
| 7,146,057 B2* | 12/2006 | Clark et al. | 382/242 |
| 7,406,208 B2 | 7/2008 | Chiang | |
| 7,586,520 B2 | 9/2009 | Igarashi | |
| 7,590,288 B1 | 9/2009 | Alvarez | |
| 7,668,389 B2 | 2/2010 | Kitamura | |
| 7,720,302 B2 | 5/2010 | Aoyama | |
| 7,899,264 B2 | 3/2011 | Stewart | |
| 7,978,247 B2 | 7/2011 | Nakajima | |
| 8,159,600 B2 | 4/2012 | Tay | |
| 8,264,591 B2 | 9/2012 | Yeo | |
| 8,457,431 B2 | 6/2013 | Tay | |
| 8,462,258 B2 | 6/2013 | Tay | |
| 8,630,504 B2 | 1/2014 | Tay | |
| 8,724,009 B2 | 5/2014 | Tay | |
| 2002/0114015 A1 | 8/2002 | Fujii | |
| 2002/0191973 A1 | 12/2002 | Hofer et al. | |
| 2003/0053161 A1 | 3/2003 | Li | |
| 2003/0099044 A1 | 5/2003 | Fujii | |
| 2003/0113032 A1 | 6/2003 | Wang | |
| 2003/0158710 A1 | 8/2003 | Bowley, Jr. | |
| 2003/0219172 A1 | 11/2003 | Caviedes | |
| 2004/0267506 A1 | 12/2004 | Bowley, Jr. | |
| 2005/0094900 A1 | 5/2005 | Abe | |
| 2005/0189419 A1 | 9/2005 | Igarashi | |
| 2005/0231603 A1 | 10/2005 | Poon | |
| 2005/0243351 A1 | 11/2005 | Aoyama | |
| 2005/0244077 A1 | 11/2005 | Kitamura | |
| 2005/0248655 A1 | 11/2005 | Kitamura | |
| 2005/0249429 A1 | 11/2005 | Kitamura | |
| 2006/0029284 A1* | 2/2006 | Stewart | 382/255 |
| 2006/0056835 A1 | 3/2006 | Poon et al. | |
| 2006/0062484 A1 | 3/2006 | Aas | |
| 2006/0078217 A1* | 4/2006 | Poon et al. | 382/255 |
| 2006/0078218 A1 | 4/2006 | Igarashi | |
| 2006/0188170 A1 | 8/2006 | Kanda | |
| 2006/0204120 A1 | 9/2006 | Poon | |
| 2006/0249429 A1 | 11/2006 | Iki | |
| 2006/0290932 A1 | 12/2006 | Kawanami | |
| 2007/0058879 A1 | 3/2007 | Cutler | |
| 2007/0206937 A1 | 9/2007 | Kusaka | |
| 2007/0279696 A1 | 12/2007 | Matsuzaka | |
| 2008/0008398 A1* | 1/2008 | Tanaka et al. | 382/275 |
| 2008/0021665 A1 | 1/2008 | Vaughn | |
| 2008/0036900 A1 | 2/2008 | Nakajima | |
| 2008/0137982 A1* | 6/2008 | Nakajima | 382/264 |
| 2008/0151309 A1 | 6/2008 | Mizobe | |
| 2008/0219655 A1 | 9/2008 | Yoon et al. | |
| 2008/0267508 A1* | 10/2008 | Steffensen | 382/199 |
| 2008/0309777 A1 | 12/2008 | Aoyama | |
| 2009/0060329 A1 | 3/2009 | Nakajima | |
| 2009/0102963 A1* | 4/2009 | Yeo et al. | 348/349 |
| 2009/0160962 A1 | 6/2009 | Tabuchi et al. | |
| 2009/0256927 A1 | 10/2009 | Komiya et al. | |
| 2009/0278947 A1 | 11/2009 | Schultz | |
| 2010/0033617 A1 | 2/2010 | Forutanpour | |
| 2010/0128144 A1 | 5/2010 | Tay | |
| 2010/0303352 A1* | 12/2010 | Nobuoka | 382/167 |
| 2011/0058095 A1* | 3/2011 | Chou et al. | 348/347 |
| 2011/0134312 A1 | 6/2011 | Tay | |
| 2011/0199468 A1* | 8/2011 | Gallagher et al. | 348/59 |
| 2011/0249173 A1* | 10/2011 | Li et al. | 348/349 |
| 2012/0314121 A1 | 12/2012 | Tay | |
| 2013/0265480 A1 | 10/2013 | Tay | |

FOREIGN PATENT DOCUMENTS

| | | | |
|---|---|---|---|
| EP | 1 407 940 A2 | 4/2004 | |
| GB | 2 475 983 A | 6/2011 | |
| GB | 2475983 A | 6/2011 | |
| JP | 61-210310 A | 9/1986 | |
| JP | 03-154576 A | 7/1991 | |
| JP | 07-177414 A | 7/1995 | |
| JP | 1996-68721 A | 3/1996 | |
| JP | 1998-099279 A | 4/1998 | |
| JP | 2001-331806 A | 11/2001 | |
| JP | 2002/189164 A | 7/2002 | |
| JP | 2002-189164 A | 7/2002 | |
| JP | 2002-209135 A | 7/2002 | |
| JP | 2002/214513 A | 7/2002 | |
| JP | 2002-214513 A | 7/2002 | |
| JP | 2002/214523 A | 7/2002 | |
| JP | 2002/214524 A | 7/2002 | |
| JP | 2003-125198 A | 4/2003 | |
| JP | 2003-167182 A | 6/2003 | |
| JP | 2003-262783 A | 9/2003 | |
| JP | 2004-028761 A | 1/2004 | |
| JP | 2004/110059 A | 4/2004 | |
| JP | 2004-198715 A | 7/2004 | |
| JP | 2004-219546 A | 8/2004 | |
| JP | 2006-171840 A | 6/2006 | |
| JP | 2009-218806 A | 9/2009 | |
| WO | 2009-063326 A | 5/2009 | |
| WO | 2010/036249 A1 | 4/2010 | |
| WO | 2010/061250 A1 | 6/2010 | |
| WO | WO 2010/061250 A1 | 6/2010 | |

OTHER PUBLICATIONS

Japan Patent Application No. 2012-542670, First Office Action (Rejection), mailed on Oct. 7, 2014, by Japan Patent Office.

PCT/IB2010/055649 International Search Report, mailed on May 5, 2011 by the European Patent Office, Rijswijk.

PCT/IB2010/055649 Written Opinion of the International Search Authority, mailed on May 5, 2011 by the European Patent Office, Rijswijk.

Groen et al., A comparison of different focus functions for use in autofocus algorithms, Cytometry 6, 1985, pp. 81-91.

PCT/IB2011/52515 International Search Report, mailed on Nov. 4, 2011 by the European Patent Office, Rijswijk.

PCT/IB2011/52515 Written Opinion of the International Search Authority, mailed on Nov. 4, 2011 by the European Patent Office, Rijswijk.

European Patent Application No. 11735546.1, First Examination Report, mailed Jan. 9, 2015 from the European Patent Office. (See in particular Sheet 2, Section 3 regarding finding that the subject matter of claims 1 and 2 are inventive in view of WO 2010/036249 A1 (Hong Li), which is currently cited against the present US application as ground for rejection based on anticipation. The Primary Examiner has 8 years experience as patent examiner and before that 12 years of engineering and project experience. See attached LinkedIn profile or Martin Oelsner.).

LinkedIn profile of European Patent Examiner.

PCT/IB2010/055641 Invitation to Pay Additional Fees.

Law, T. et al: "Image Filtering, Edge Detection, and Edge Tracing Using Fuzzy Reasoning", IEEE Transactions on Pattern Analysis and Machine Intelligence, IEEE Service Center, Los Alamitos, CA, US, vol. 18, No. 5, May 1, 1996, pp. 481-491, XP000592440, ISSN: 0162-8828, DOI: 10.1109/34.494638 p. 482, right-hand column.

PCT/IB2010/055641 International Search Report.

PCT/IB2010/055641 Written Opinion of the International Search Authority.

Colchester A C F et al. "A hierarchical rule-based method for image segmentation using maximum gradient profiles", Proceedings of the Alvey Vision Conference, vol. 4th, Jan. 1, 1988 (Jan. 1, 1988), pp. 211-220, XP009147417, p. 211, left-hand column.

Ingmar Jahr: "Lexikon der Industriellen Verarbeiting", Jul. 19, 2007 (Jul. 19, 2007), pp. 1-88, XP55010414, Retrieved from the Internet: URL: http://www.hochschule-bochum.de/fileadmin/media/fb_m/Institute/Automatisierung/LeixikonIndustrBildverarb.pdf, [retrieved by EPO as the ISR for PCT/IB2011/052529 on Oct. 25, 2011], pp. 32 [Fokusierung, Fokustest] and 46 [Kantenform].

Ingmar Jahr: "Labor für Informatik (LFI)", Oct. 25, 2011 (Oct. 25, 2011), XP55010416, Retrieved from the Internet: URL:http://www.hochschule-bochum.de/fbm/einrichtungen/institute/automatisierung/downloads/labor-fuer-informatik-lfi.html [retrieved on Oct. 25, 2011 by EPO as the ISR for PCT/IB2011/052529].

(56) References Cited

OTHER PUBLICATIONS

PCT/IB2011/052529, International Search Report by the ISA.
PCT/IB2011/052529, Written Opinion of the ISA.
Bernd Jahne, "Practical Handbook on Imaging Processing for Scientific and Technical Applications," 2nd edition, Mar. 15, 2004, pp. 392-394, CRC Press.
UK Patent Application No. GB1020759.5 Search Report under Section 17.
Andrew, John R., "Variable focusing due to refractive-index gradients in a diode-array traveling-wave amplifier", Journal of Applied Physics, 1988, pp. 2134-2137, vol. 64, issue 4, AIP Journals & Magazines, USA.
Chung, M. et al., "Initial density profile measurements using a Laser-Induced Fluorescence diagnostic in the Paul Trap Simulator Experiment", Particle Accelerator Conference, 2007, pp. 3666-3668, IEEE Conference Publications, USA.
Oishi, T. et al., "Beam emission spectroscopy measurement for density fluctuations in compact helical system", Review of Scientific Instruments, 2004, pp. 4118-4120, vol. 75, issue 10, AIP Journals & Magazines, USA.
Hansen, J.L. et al., "Conformer separation of 3-aminophenol using an electrostatic deflector", Lasers and Electro-optics 2009 and the European Quantum Electronics Conference CLEO Europe—EQEC 2009, European Conference on, p. 1.
Urruchi, V. et al., "Electrical modeling and characterization of voltage gradient in liquid crystal microlenses", Review of Scientific Instruments, 2013, vol. 84, issue 11, pp. 116105-116105-3, AIP Journals & Magazines, USA.
Reedy, R.C. et al., "Low-cost modification for the high-frequency raster on the camera IMS-3F secondary ion mass spectrometer", Journal of Vacuum Science and Technology A, vol. 17, issue 1, 1999, pp. 317-318, AVS Journals & Magazines, USA.
Yan, Qing et al., "No-reference image blur assessment based on gradient profile sharpness", Broadband Multimedia Systems & Broadcasting, 2013 Symposium on, 2013, pp. 1-4, IEEE Conference Publications, USA.
Liu, Lian-Jie et al., "A fast auto-focusing technique for multi-objective situation", Computer Application and System Modelling (ICCASM), 2010 International Conference on, vol. 1, 2010, pp. V1-607-V1-610, IEEE Conference Publications, USA.
Yan, Qing et al., "Separation of weak reflection from a single superimposed image using gradient profile sharpness", Circuits and Systems (ISCAS), 2013 IEEE International Symposium on, 2013, pp. 937-940, IEEE Conference Publications, USA.
Liu, Ruian et al., "Adaptive regulation of CCD camera in eye gaze tracking system", Image and Signal Processing, 2009 CISP '09, 2nd International Conference on, 2009, pp. 1-4, IEEE Conference Publications, USA.
Liu, Hong et al., "Depth reovery from defocus images using total variation", Computer Modelling and Simulation, 2010, ICCMS '10, Second International Conference on, vol. 2, 2010, pp. 146-150, IEEE Conference Publications, USA.
Harasse, S., et al., "Content and illumination invariant blur measures for realtime video processing", Computer and Information Technology, 2007 CIT 200 7th IEEE International Conference on, 2007, pp. 551-556, IEEE Conference Publications, USA.
Liu, Ruian, et al., "Real time auto-focus algorithm for eye gaze tracking system", Intelligent Signal Processing and Communication Systems, 2007 ISPACS 2007, International Symposium on, 2007, pp. 742-745, IEEE Conference Publications, USA.
Choi, Kang-Sun et al., "New autofocusing technique using the frequency selective weighted median filter for video cameras", Consumer Electronics, 1999, ICCE International Conference on, 1999, pp. 160-161, IEEE Conference Publications, USA.
Pan, Lin et al., Application of Edge Confidence Detection in the Autofocus under Fundus Camera, 2010 Second WRI Global Congress on Intelligent Systems (GCIS), vol. 2, DOI: 10.1109/GCIS.2010.17, 2010, pp. 399-402, IEEE Conference Publications.
Nguyen, Thuy Tuong et al., Camera auto-exposing and auto-focusing for edge-related applications using a particle filter, 2010 IEEE/RSJ International Conference on Intelligent Robots and Systems (IROS), DOI: 10.1109/IROS.2010.6661024, 2010, pp. 1177-1182, IEEE Conference Publications.
Shoa, T. et al., Optimization algorithm for restoring an all-focused micromechanical structure image, 2004 Canadian Conference on Electrical and Computer Engineering, vol. 3, DOI: 10.1109/CCECE.2004.1349742, 2004, pp. 1707-1710, vol. 3, IEEE Conference Publications.
Shah, P. et al., An efficient adaptive fusion scheme for multifocus images in wavelet domain using statistical properties of neighborhood, 2011 Proceedings of the 14th International Conference on Information Fusion (FUSION), 2011, pp. 1-7, IEEE Conference Publications.

* cited by examiner $b = a \cos\phi$ corrects edge width for slant angle $\phi$
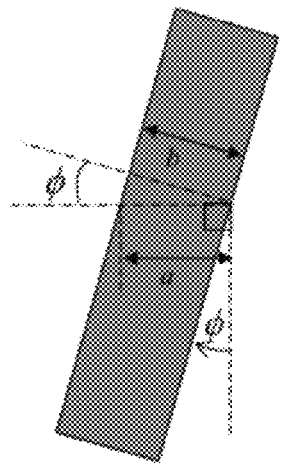
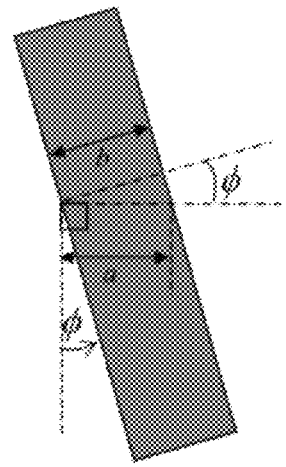
FIG. 6A　　　　　　　　　　　　FIG. 6B
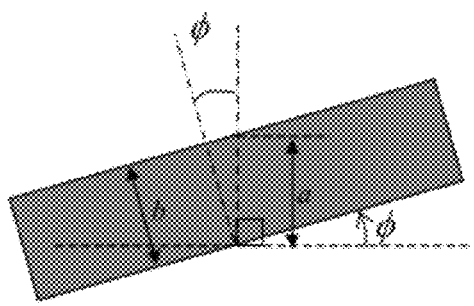
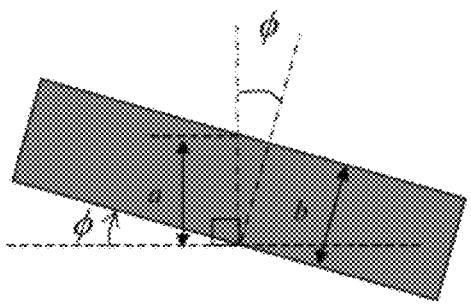
FIG. 6C　　　　　　　　　　　　FIG. 6D

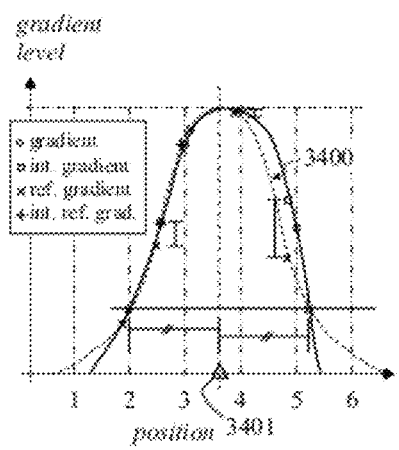
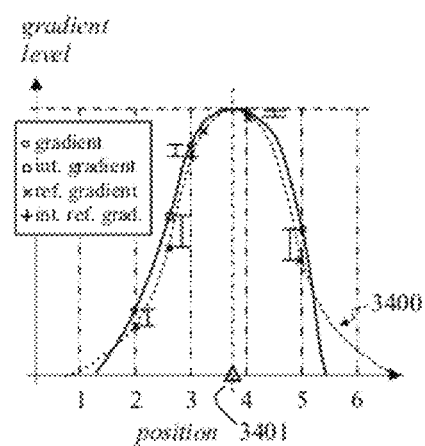
FIG. 34          FIG. 35
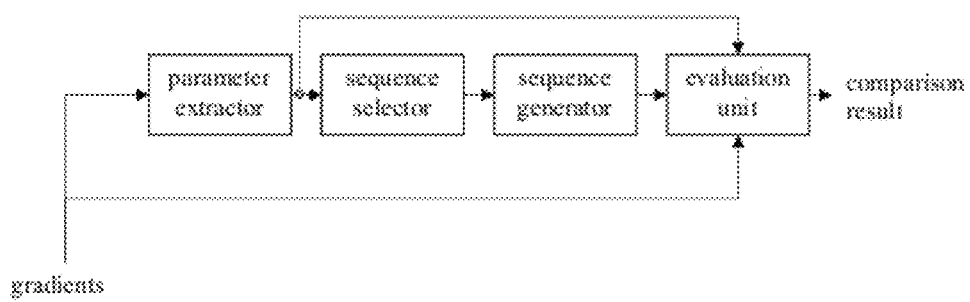
FIG. 36

US 9,065,999 B2

METHOD AND APPARATUS FOR EVALUATING SHARPNESS OF IMAGE

CROSS-REFERENCE TO RELATED APPLICATIONS

This application claims priority to U.S. Provisional Patent Application No. 61/467,379 filed on Mar. 25, 2011, and is a continuation-in-part of PCT Application No. PCT/IB2011/52524 filed on Jun. 9, 2011.

BACKGROUND OF THE INVENTION

1. Field of the Invention

The subject matter disclosed generally relates to auto-focusing electronically captured images.

2. Background Information

Photographic equipment such as digital cameras and digital camcorders may contain electronic image sensors that capture light for processing into still or video images, respectively. Electronic image sensors typically contain millions of light capturing elements such as photodiodes.

Many image capturing devices such as cameras include an auto-focusing system. The process of auto-focusing includes the steps of capturing an image, processing the image to determine whether it is in focus, and if not, generating a feedback signal that is used to vary a position of a focus lens ("focus position"). There are two primary auto-focusing techniques. The first technique involves contrast measurement, the other technique looks at a phase difference between a pair of images. In the contrast method the intensity difference between adjacent pixels is analyzed and the focus is adjusted until a maximum contrast is detected. Although acceptable for still pictures the contrast technique is not suitable for motion video.

The phase difference method includes splitting an incoming image into two images that are captured by separate image sensors. The two images are compared to determine a phase difference. The focus position is adjusted until the two images match. The phase difference method requires additional parts such as a beam splitter and an extra image sensor. Additionally, the phase difference approach analyzes a relatively small band of fixed detection points. Having a small group of detection points is prone to error because noise may be superimposed onto one or more points. This technique is also ineffective if the detection points do not coincide with an image edge. Finally, because the phase difference method splits the light the amount of light that impinges on a light sensor is cut in half or even more. This can be problematic in dim settings where the image light intensity is already low.

BRIEF SUMMARY OF THE INVENTION

An auto focus image system that includes a pixel array coupled to a focus signal generator. The pixel array captures an image that has a plurality of edges. The generator generates a focus signal that is a function of a plurality of edge-sharpness measures for the plurality of edges. The generator compares a sequence of gradients across the edge with one or more reference sequences of gradients and/or reference curves defined by data retrieved from a non-volatile memory. The generator may reject or de-emphasize the edge using result of the comparison. The edge-sharpness measure is a quantity whose unit is a positive or negative, integer or non-integer power of a unit of length. It may be measured from the edge and/or a reference sequence/curve matched to the edge, or may be retrieved for the matched reference sequence/curve from a non-volatile memory.

A method for evaluating a degree of sharpness of an image on basis of a plurality of edges within said image, comprising: curve-fitting a gradient profile of an edge among said plurality of edges with a sequence of two or more reference gradients, among which at least two reference gradients have different gradient values; performing a comparison of said sequence with said gradient profile; and, making a determination, based at least in part on a result of said comparison, of a weight of one or more quantities from said gradient profile and/or said sequence in contributing to an evaluation of said degree of sharpness.

BRIEF DESCRIPTION OF THE DRAWINGS

FIG. 6A, 6B are illustrations of a calculation of an edge width of a vertical edge having a slant angle φ;

FIG. 6C, 6D are illustrations of a calculation of an edge width of a horizontal edge having a slant angle φ;

FIG. 34 shows a sequence of reference gradients aligned to a gradient profile such that a reference peak aligns to a midpoint of the gradient profile at a particular gradient level;

FIG. 35 shows the sequence aligned to the gradient profile of FIG. 34 such that the reference peak aligns to an interpolated peak, instead, of the gradient profile;

FIG. 36 shows an embodiment of a gradient profile checker that qualifies gradient profiles.

DETAILED DESCRIPTION

Disclosed is an auto focus image system that includes a pixel array coupled to a focus signal generator. The pixel array captures an image that has at least one edge with a width. The focus signal generator may generate a focus signal that is a function of the edge width and/or statistics of edge widths. An auto focus image system that includes a pixel array coupled to a focus signal generator. The pixel array captures an image that has at least one edge with a width. The generator generates a focus signal that is a function of the edge width and various statistics of edge width. The generator may eliminate an edge having an asymmetry of a gradient of an image signal. The generator may also eliminate an edge that fails a template for an associated peaking in the gradient. A processor receives the focus signal and/or the statistics of edge widths and adjusts a focus position of a focus lens. The edge width can be determined by various techniques including the use of gradients. A histogram of edge widths may be used to determine whether a particular image is focused or unfocused. A histogram with a large population of thin edge widths is indicative of a focused image.

Architecture

Figure 1:
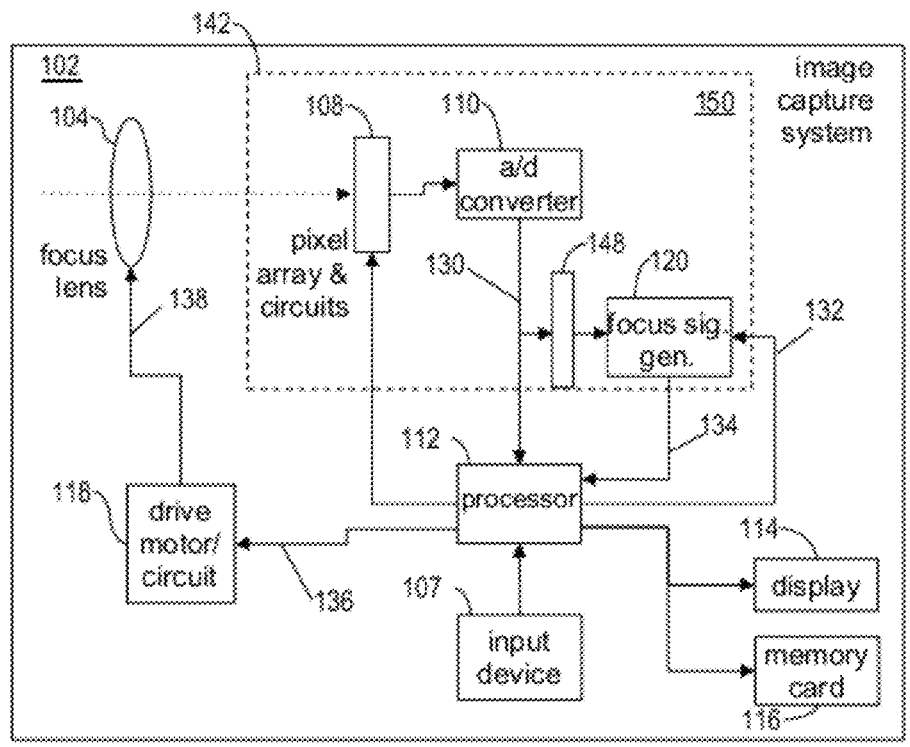
FIG. 1 is a schematic of an embodiment of an auto-focus image pickup apparatus.
Figure 2:
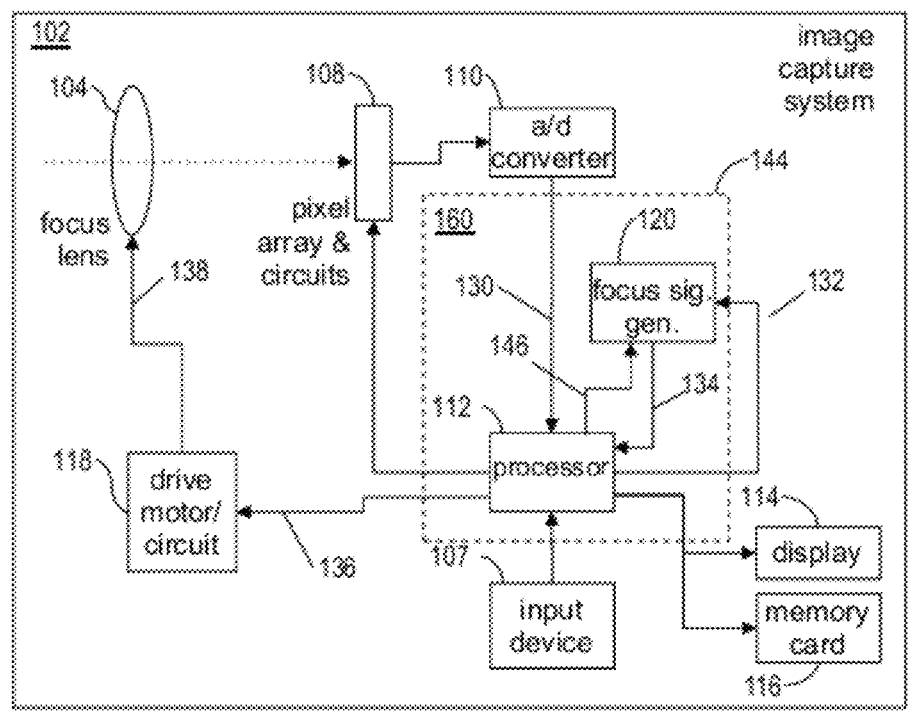
FIG. 2 is a schematic of an alternate embodiment of an auto-focus image pickup apparatus.

Referring to the drawings more particularly by reference numbers, FIG. 1 shows an embodiment of an auto-focus image capture system 102. The system 102 may be part of a digital still camera, but it is to be understood that the system can be embodied in any device that requires controlled focusing of an image. The system 102 may include a focus lens 104, a pixel array and circuits 108, an A/D converter 110, a processor 112, a display 114, a memory card 116 and a drive motor/circuit 118. Light from a scene enters through the lens 104. The pixel array and circuits 108 generates an analog signal that is converted to a digital signal by the A/D Converter 110. The pixel array 108 may incorporate a mosaic color pattern, e.g. the Bayer pattern. The digital signal may be sent to the processor 112 that performs various processes, e.g. color interpolation, focus position control, color correction, image compression/decompression, user interface control, and display control, and to the focus signal generator 120. Where the focus signal generator 120 and the processor 112 reside within different packages, a color interpolation unit 148 may be implemented to perform color interpolation on the digital signal 130 to estimate the missing color signals on each pixel for the focus signal generator 120. Alternately, where the focus signal generator 120 and the processor 112 reside together within a package 144, the focus signal generator 120 may input interpolated color images from the processor 112 on bus 146 as shown in FIG. 2 or a single image signal derived from the original image signal generated from the A/D converter 110, for example a grayscale signal.

The focus signal generator 120 receives a group of control signals 132 from the processor 112, in addition, and may output signals 134 to the processor 112. The output signals 134 may comprise one or more of the following: a focus signal 134, a narrow-edge count, and a set of numbers representing a statistics of edge width in the image. The processor 112 may generate a focus control signal 136 that is sent to the drive motor/circuit 118 to control the focus lens 104. A focused image is ultimately provided to the display 114 and/or stored in the memory card 116. The algorithm(s) used to adjust a focus position may be performed by the processor 112.

The pixel array and circuits 108, A/D Converter 110, focus signal generator 120, and processor 112 may all reside within a package. Alternately, the pixel array and circuits 108, A/D Converter 110, and focus signal generator 120 may reside within a package 142 as image sensor 150 shown in FIG. 1, separate from the processor 112. Alternatively, the focus signal generator 120 and processor 112 may together reside within a package 144 as a camera controller 160 shown in FIG. 2, separate from the pixel array 108 and A/D Converter 110. The focus signal generator 120 (or any alternative embodiment, such as one shown in FIG. 26) and the processor 112 may together reside on a semiconductor substrate, such as a silicon substrate.

Focus Signal Generator

Figure 3:
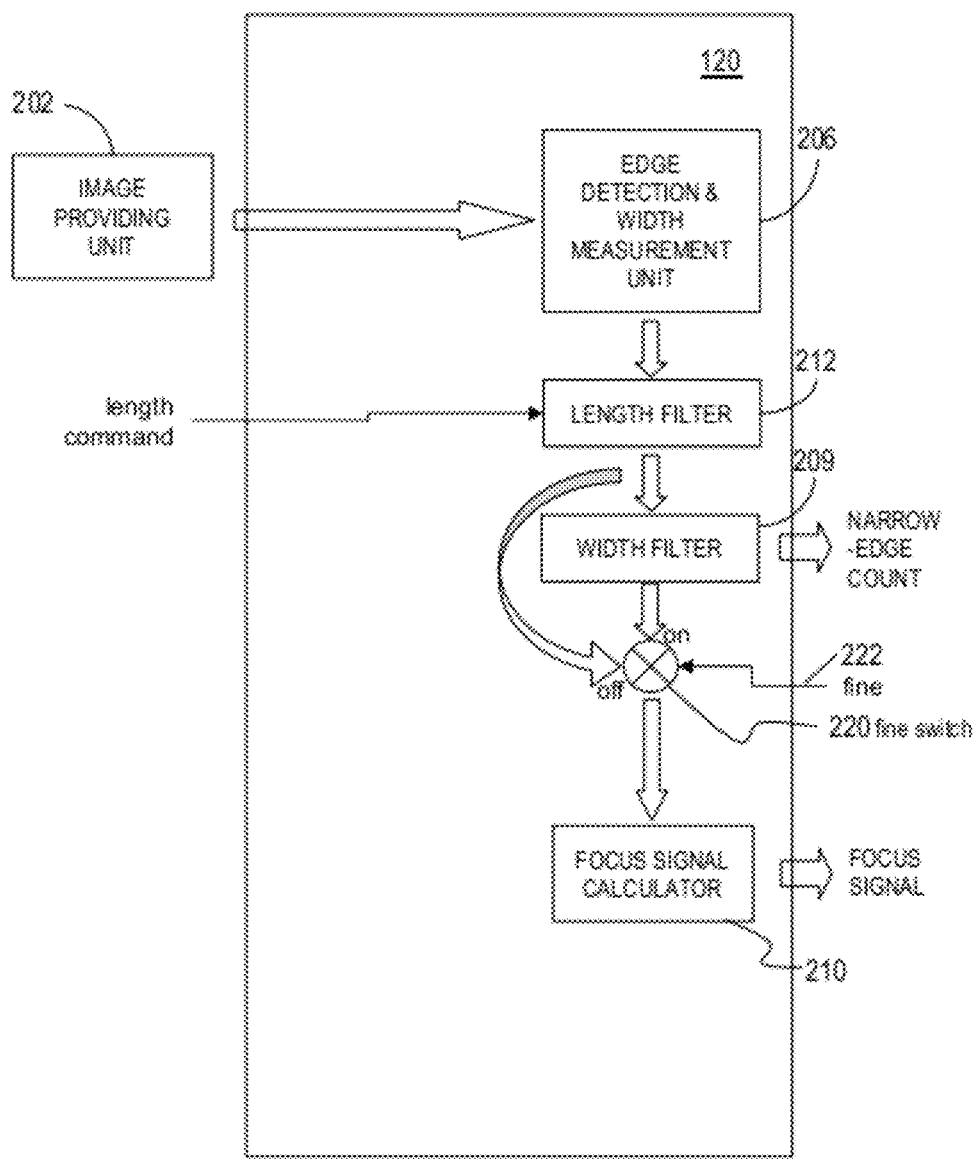
FIG. 3 is a block diagram of a focus signal generator.

FIG. 3 shows an embodiment of a focus signal generator 120 receiving image(s) from a image providing unit 202. The image providing unit 202 may be the color interpolator 148 in FIG. 1 or the processor 212 in FIG. 2. The focus signal generator 120 may comprise an edge detection & width measurement (EDWM) unit 206, a focus signal calculator 210, a length filter 212, and a width filter 209. It may further comprise a fine switch 220 controlled by input 'fine' 222. The focus signal generator 120 may provide a narrow-edge count from the width filter 209 and a focus signal from the focus signal calculator 210, the focus signal being configurable between a fine focus signal and a gross focus signal, selectable by input 'fine' 222. Alternately, both fine focus signal and gross focus signal may be calculated and output as part of output signals 134. The edge detection & width measurement unit 206 receives image(s) provided by the image providing unit 202. In the context of FIGS. 1 and 2, control signals, such as control signal 'fine' 222, may be provided by the processor 112 in signals 132. Also in the context of FIGS. 1 and 2, the output signals 134 may be provided to the processor 112, which functions as a focus system controller that controls the focus position of the focus lens 104 to bring images of objects into sharp focus on the pixel array 108 by analyzing the output signals 134 to detect a sharp object in the image. Various components of the focus signal generator 120 are described below.

The EDWM unit 206 may transform the input image such that the three signals of the image, red (R), green (G) and blue (B) are converted to a single image signal. Several techniques can be utilized to transform an image to a single image. RGB values can be used to calculate a luminance or chrominance value or a specific ratio of RGB values can be taken to form the single image signal. For example, the luminance value can be calculated with the equation Y=0.2126*R+0.7152*G+ 0.0722*B, where Y is luminance value. The single image signal may then be processed by a Gaussian filter or any lowpass filter to smooth out image data sample values among neighboring pixels to remove a noise.

The focus signal generator 120, 120', 120" is not limited to grayscale signal. It may operate on any one image signal to detect one or more edges in the image signal. Or it may operate on any combination of the image signals, for example Y, R-G, or B-G. It may operate on each and every one of the R, G, B image signals separately, or any one or more combinations thereof, to detect edges. It may form statistics of edge widths for each of the R, G, B image signals, or any combination thereof. It may form a focus signal from statistics of edge widths from one or more image signals.

The focus signal generator includes an edge detector to identify an edge in an image signal. The edge detector may use a first-order edge detection operator, such as Sobel operator, Prewitt operator, Roberts Cross operator, or Roberts operator. The edge detector may use a higher-order edge detection operator to identify the edge, for example a second order operator such as a Laplacian operator. The edge detector may use any one of the known edge detection operators or any improved operator that shares a common edge detection principle of any of the known operators.

Where the edge detector uses a first-order edge detection operator, a gradient (i.e. first derivative) of the image signal is computed. There are various methods available to calculate the gradient, including using any one of various first order edge detection operators such the Sobel operator, the Prewitt operator, the Roberts Cross operator, and the Roberts operator. The Roberts operator has two kernels which are single column or single row matrices: [−1 +1] and its transpose. The Roberts Cross operator has two kernels which are 2-by-2 matrices: [+1, 0; 0, −1] and [0, +1; −1, 0], shown in the format of [<first-row vector; second-row vector; third-row vector] like in Matlab. The Prewitt and the Sobel operator are basically have the same kernels, [−1, 0, +1] taking gradient in a direction of the row and its transpose taking gradient in a direction of the column, further multiplied by different lowpass filter kernels performing lowpass filterings perpendicular to the respective gradient directions. Gradients across the columns and the rows may be calculated to detect vertical and horizontal edges respectively, for example using a Sobel-X operator and a Sobel-Y operator, respectively. Sobel X-operator at pixel location [k, q] where k is a row number and q is a column number, is given by the equation Sx[k, q]=U[k, q+1]−U[k, q−1]. Sobel Y-operator at the same location is given by the equation Sy[k,q]=U[k+1,q]−U[k−1,q], where U is an image signal of the processed image.

Where the edge detector uses a second-order operator, a second derivative (such as the Laplacian) of the image signal is computed.

Orientation Tagging

Figures 4, 5:
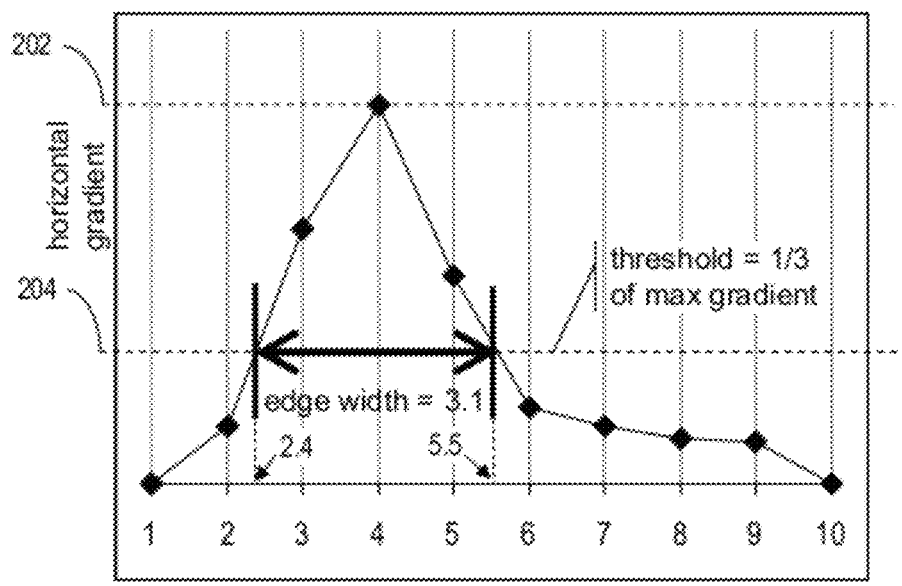
FIG. 4 is an illustration of a horizontal Sobel operator's operation on a image signal matrix.
FIG. 5 illustrates a calculation of edge width from a horizontal gradient.

Each pixel may be tagged either a horizontal edge ('H') or a vertical edge ('V') if either vertical or horizontal gradient magnitude exceeds a predetermined lower limit ("elimination threshold"), e.g. 5 for an 8-bit image, or no edge if neither is true. This lower limit eliminates spurious edges due to gentle shading or noise. A pixel may be tagged a vertical edge if its horizontal gradient magnitude exceeds its vertical gradient magnitude by a predetermined hysteresis amount or more, e.g. 2 for an 8-bit image, and vice versa. If both gradient magnitudes differ less than the hysteresis amount, the pixel gets a direction tag same as that of its nearest neighbor that has a direction tag already determined. For example, if the image is scanned from left to right in each row and from row to row downwards, a sequence of inspection of neighboring pixels may be the pixel above first, the pixel above left second, and the pixel on the left third, and the pixel above right last. Applying this hysteresis helps to ensure that adjacent pixels get similar tags if each of them has nearly identical horizontal and vertical gradient magnitudes. FIG. 4 illustrates the result of tagging on a 6-by-6 array of horizontal and vertical gradients. In each cell, the horizontal gradient is in the upper-left, vertical gradient is on the right, and direction tag is at the bottom. Only pixels that have either horizontal or vertical gradient magnitude exceeding 5 qualify at this step as edge pixels are printed in bold and get direction tags.

The image, gradients and tags may be scanned horizontally for vertical edges, and vertically for horizontal edges. Each group of consecutive pixels in a same row, having a same horizontal gradient polarity and all tagged for vertical edge may be designated a vertical edge if no adjacent pixel on left or right of the group are likewise. Likewise, each group of consecutive pixels in a same column having a same vertical gradient polarity and all tagged for horizontal edge may be designated a horizontal edge if no adjacent pixel above or below the group satisfies the same. Thus horizontal and vertical edges may be identified.

Edge Width

Each edge may be refined by removing pixels whose gradient magnitudes are less than a given fraction of the peak gradient magnitude within the edge. FIG. 5 illustrates this step using a refinement threshold equal to one third of the edge's peak gradient magnitude, refining the edge width down to 3 from the original 9. This edge refinement distinguishes the dominant gradient component that sets the apparent edge width that dominates visual perception of the edge's sharpness despite an image having multiple overlapping shadings that may cause gradients to gently decay over many pixels.

Edge width may be calculated in any one of known methods. One method of calculating edge width is simply counting the number of pixels within an edge. An alternate method of calculating edge width is shown in FIG. 5. In FIG. 5, a first fractional pixel position (2.4) is found between a first outer pixel (pixel 3) of a refined edge and the adjacent outside pixel (pixel 2) by an interpolation from the refinement threshold 304. Likewise, a second fractional pixel position (5.5) is found between a second outer pixel (pixel 5) and its adjacent outside pixel (pixel 6). The edge width is found as the difference between these two fractional pixel positions, 5.5−2.4=3.1.

Another alternative edge width calculation method is to calculate a difference of the image signal across the edge (with or without edge refinement) and divide it by a peak gradient of the edge.

Alternatively, edge width may be a distance between a pair of positive and negative peaks (or interpolated peak(s)) of the second order derivative of the image signal across the edge. Other alternatives are possible, to be described under the heading "edge-sharpness measure" further into this specification.

It will be seen further into this specification under the heading "edge-sharpness measure" that there are other alternatives than a width, which is merely one example of a edge-sharpness measure that is essentially independent of illumination of the scene.

Slant Correction

Although each edge may be assigned to one prescribed direction (e.g. vertical direction or horizontal direction) or another, perpendicular, prescribed direction (e.g. horizontal direction or vertical direction) and may have its edge width measured in a direction perpendicular to that assigned edge direction, the boundaries between regions of different image signal values in the image from which these edges arise may not be and usually are not aligned perfectly with either prescribed directions. In FIG. 6A, a boundary (shaded band) is shown to be inclined at a slant angle φ with respect to the vertical dashed line, and a width a is shown to be measured in the perpendicular direction (i.e. horizontal direction). However, a width b (as indicated in the drawing) measured in a direction perpendicular to the direction of the boundary (also direction of an edge that forms a part of the boundary) is more appropriate as the width of the boundary (and also of the edge) than width a. Such widths a that are not measured perpendicularly to the respective edge directions tend to be too large and do not represent the genuine thickness of the respective boundaries.

For purposes of calculating a focus signal from edge widths, the edge widths measured in one or the other of those prescribed directions are to be corrected by reducing them down to be widths in directions perpendicular to directions of the respective edges. The Edge Detection and Width Measurement Unit 206 performs such a correction on edge widths. As shown in FIG. 6A, the measured width a is the length of the hypotenuse of a right-angled triangle that has its base (marked with width b) straddling across the shaded boundary perpendicularly (thus perpendicular to the edge direction) and that has the angle φ. The corrected width b may then be obtained from a projection of the measured width a to the direction perpendicular to the edge direction. From elementary trigonometry, such a projection may be given by b=a cos(φ), but approximation may be used as long as it obtains accuracy to within 20%. The angle φ, or cos(φ) itself, may be found by any method known in the art for finding a direction of an edge in an image, or by a more accurate method described in the flowchart shown in FIG. 7.

Each horizontal or vertical edge's edge width may be corrected for its slant from either the horizontal or vertical orientation (the prescribed directions), respectively. FIG. 6A, 6B illustrate a correction calculation for an edge width measured in the horizontal direction for a boundary (and hence edges that form the boundary) that has a slant from the vertical line. FIG. 6C, 6D illustrate a correction calculation for an edge width measured in the vertical direction for a boundary (and hence edges that form the boundary) that has a slant from the horizontal line. The correction may be made by multiplying the edge width measured in a prescribed direction, such as a vertical direction or a horizontal direction, by a factor of cos φ, where φ is an angle of slant from the prescribed direction.

Figures 7, 8:
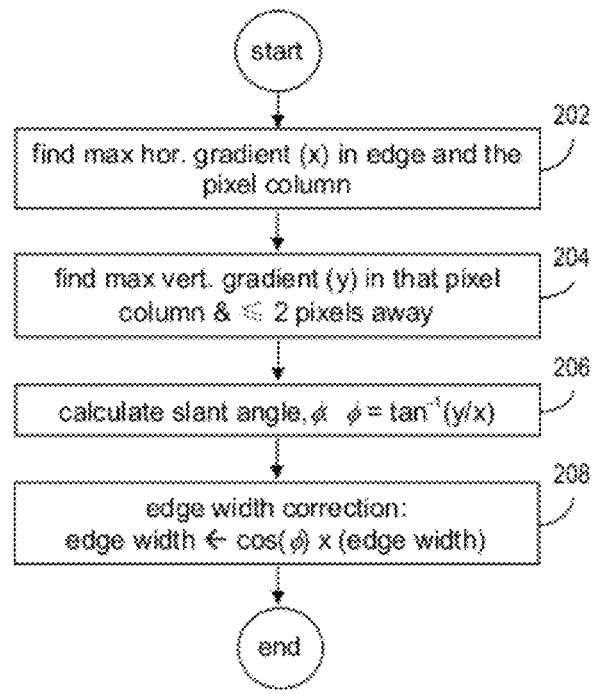
FIG. 7 is a flowchart of a process to calculate a slant angle φ and correct an edge width for a vertical edge having a slant.
FIG. 8 is an illustration of a vertical concatenated edge.

By way of example, FIG. 7 shows a flowchart of a process to correct edge widths for slant for edges inclined from a vertical line. (For horizontal edges, substitute 'row' for 'column', and interchange 'vertical' with 'horizontal' in the flowchart.)

From step 502 to step 506, a slant angle φ is found. For each vertical edge, at step 502, locate the column position where the horizontal gradient magnitude peaks, and find the horizontal gradient x. At step 504, find where the vertical gradient magnitude peaks along the column position and within two pixels away, and find the vertical gradient y.

At step 506, find the slant angle φ=tan$^{-1}$ (y/x). At step 506, the slant angle may be found by looking up a lookup table. Although steps 502 to 506 present one specific procedure and method to find the slant angle, other procedures and methods known in the art may be used instead.

Finally, at step 508, scale down the edge width by multiplying with cos(φ) or with an approximation thereto as one skilled in the art usually does in practice.

A first modification of the process shown in FIG. 7 is to substitute for step 506 and part of step 508 by providing a lookup table that has entries for various combinations of input values of x and y. For each combination of input values of x and y, the lookup table returns an edge width correction factor. The edge width correction factor output by the lookup table may be an approximation to cos(tan$^{-1}$(y/x)) to within 20%, preferably within 5%. The edge width is then multiplied with this correction factor to produce a slant-corrected edge width.

A second modification is to calculate a quotient y/x between a vertical gradient y and a horizontal gradient x to produce a quotient q, then use q to input to a lookup table that has entries for various values of q. For each value of q, the lookup table returns an edge width correction factor. The edge width correction factor may be an approximation to cos(tan$^{-}$$_1$(q)) to within 20%, preferably within 5%.

For finding the slant angle φ (or an approximation thereto such that the correction factor is accurate to within 20%) and subsequently the correction factor cos(φ) (or an approximation thereto), or to directly find the correction factor without finding the slant angle φ (as in the first and second modifications), the values of x and y may be obtained in steps 502 to 506, but other methods may be employed instead.

A third modification is to perform the following for each one of a plurality of pixels in the edge: (a) find horizontal gradient x and vertical gradient y both for a pixel, (b) find q=y/x for this pixel, and (c) find a correction factor that corresponds to q, for instance $\cos(\tan^{-1}(q))$ or an approximation thereto to within 20%. Finally, find the correction factor for the edge width by averaging across the correction factor from each of the plurality of pixels. The average may be a weighted average, such as one in which a pixel that has a larger horizontal gradient is given a larger weight than another pixel that has a lesser horizontal gradient.

Other modifications are possible along these directions or other.

Screen Threshold

Figure 9A:
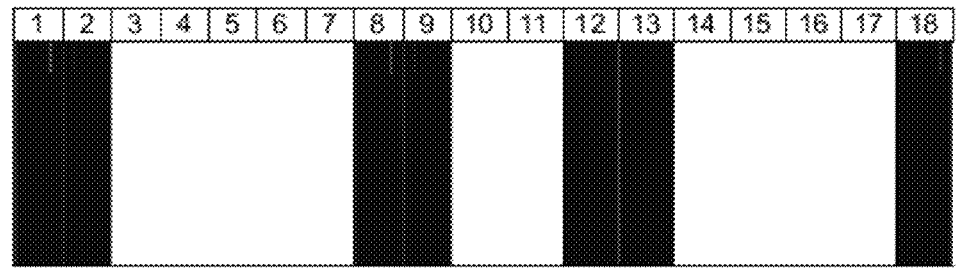
FIG. 9A is an illustration of a group of closely-packed vertical bars.
Figure 9B:
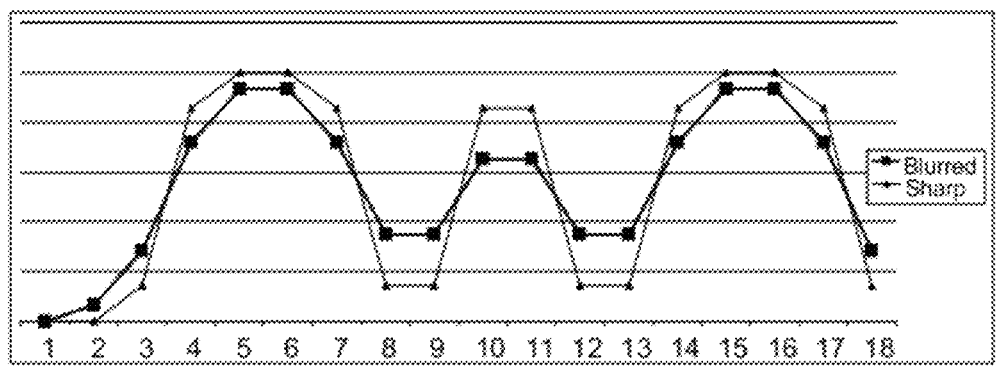
FIG. 9B is a graph of an image signal across FIG. 9A.
Figure 9C:
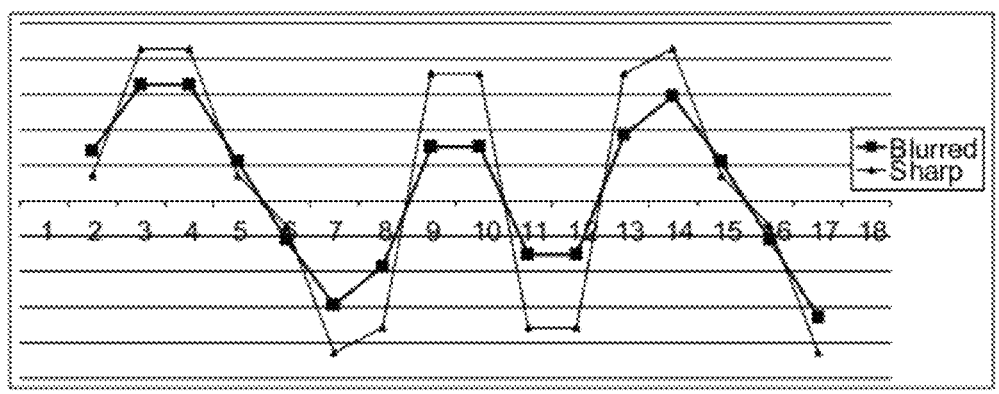
FIG. 9C is a graph of a horizontal Sobel gradient across FIG. 9A.

Adjacent edges may be prevented altogether from contributing to a focus signal, or have their contributions attenuated, if their peak gradient magnitudes are below a predetermined fraction of an adjacent wider edge's peak gradient magnitude. FIGS. 9A, 9B, and 9C illustrate a problem that is being addressed.

FIG. 9A illustrates three vertical white bars separated by two narrow black spaces each 2 pixels wide. The middle white bar is a narrow bar 2 pixels wide. FIG. 9B shows an image signal plotted horizontally across the image in FIG. 9A for each of a sharp image and a blurred image. FIG. 9C plots Sobel-x gradients of FIG. 9B for the sharp image and blurred image. In FIG. 9C, the first edge (pixels 2-5) for the blurred image is wider than that for the sharp image, and likewise the last edge (pixels 13-15) as expected. However, the two narrowest edges (pixels 9 & 10, and pixels 11 & 12) have widths of two in both images. In FIG. 9B, the corresponding slopes at pixels 9 & 10, and pixels 11 & 12, each takes two pixels to complete a transition. The blurred image, however, has a significant decline of peak gradient magnitude, as much as 50%, from the wider edge to the narrower edges. The sharp image, on the other hand, changes less than 10% between the wider and the narrower edges.

The significant decline, e.g. 20% or greater, in peak gradient magnitude for a narrower edge adjacent to a wider edge having an opposite-signed gradient gives a hint that the blurred image is not well focused, and thus the narrower edge should not be relied upon as an indication that the blurred image is sharp.

Likewise, mutually adjacent edges of alternating gradient polarities should not be relied upon for such indication even if their edge width are small as long as they are in close proximity to each other, e.g. no more than 1 pixel apart ("minimum edge gap"). The minimum edge gap is in terms of a number of pixels, e.g. 1, or 2, or in between.

Furthermore, given that one edge may have been eliminated due to having a peak gradient less than the elimination threshold, two successive edges having an identical gradient polarity and spaced no more than two times the minimum edge gap plus a sharp_edge_width (sharp_edge_width is a number assigned to designate an edge width of a sharp edge) apart may be used as a condition for eliminating or demoting a contribution from one or both of the two mutually adjacent edges. either.

The Edge Detection and Width Measurement Unit 206 may execute the following algorithm for eliminating closely-packed narrower edges based on a screen threshold established from a wider edge, and a modulation screen flag that can be turned on and off.

Figure 10:
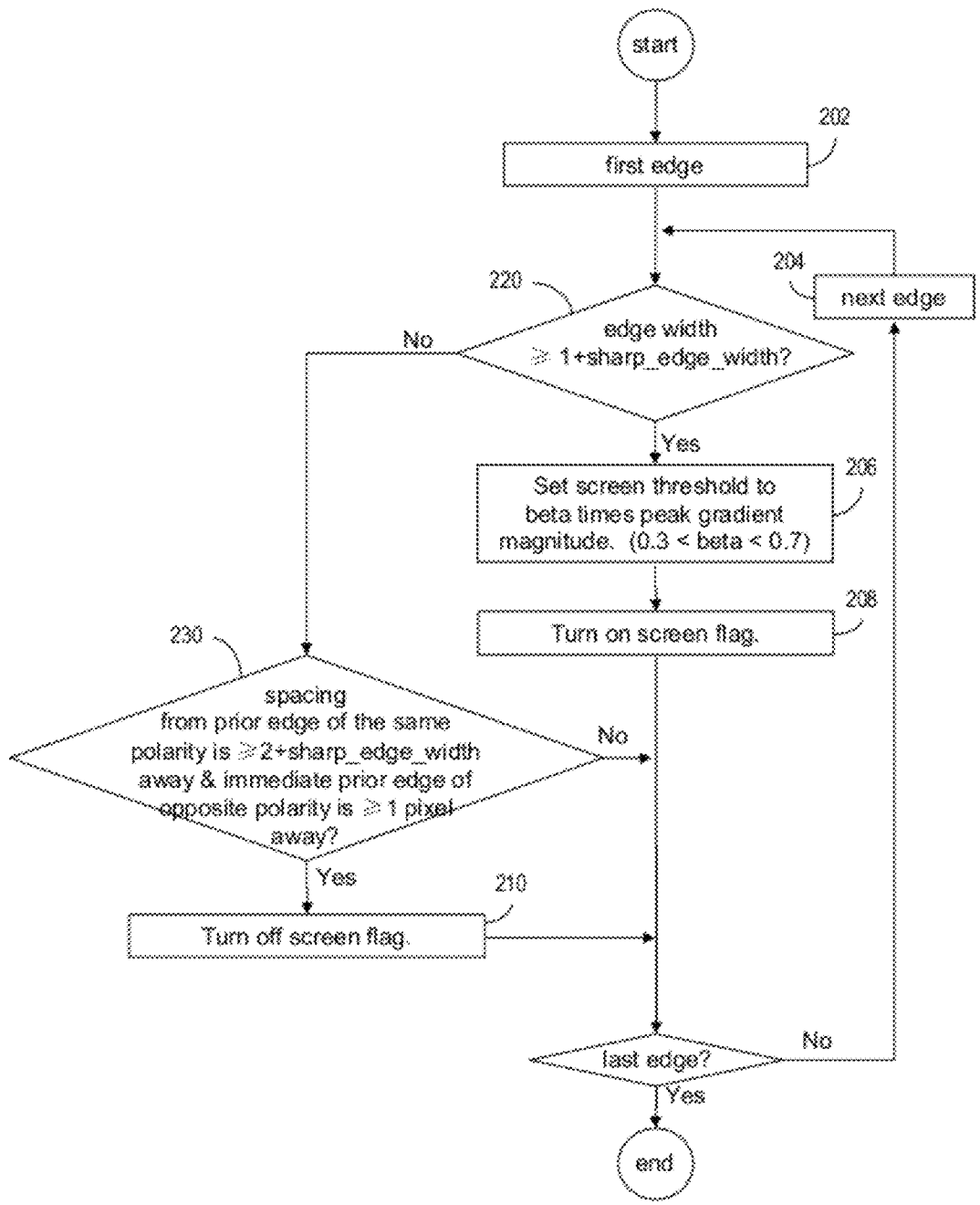
FIG. 10 is a flowchart of a process to eliminate closely-packed edges having shallow depths of modulation.

For each edge, the screen threshold and screen flag to be used for the immediate next edge of an opposite polarity are determined according to the process of the flowchart shown in FIG. 10.

Given the screen threshold and screen flag, an edge may be eliminated unless one of the following conditions is true: (a) the screen flag is off for this edge, (b) a peak gradient magnitude of the edge is not smaller than the screen threshold for this edge. To conditions (a) and (b) may be added condition (c) the edge width is not less than sharp_edge_width+1, where a number has been assigned for sharp_edge_width to designate an edge width of a sharp edge, and where the "+1" may be varied to set a range of edge widths above the sharp_edge_width within which edges may be eliminated if they fail (a) and (b). For the example shown in FIGS. 9A-9C, sharp_edge_width may be 2. FIG. 10 is a flowchart to determine a screen threshold and a screen flag for each edge. For vertical edges, assume scanning from left to right along a row, though this is not required. (For horizontal edges, assume scanning from top to bottom along a column, though this is not required.) A number is assigned for sharp_edge_width and may be 2 for the example shown in FIGS. 9A-9C. Starting at the first edge at step 702, each edge is queried at step 720 as to whether its edge width is greater than or equal to one plus sharp_edge_width, the value of one being the minimum edge gap value used for this illustration, but a different value may be used, such as between 0.5 and 2.0. If yes, the edge is a wider edge, and step 706 follows to set the screen threshold for the immediate next edge that has an opposite polarity to beta times a peak gradient magnitude of the edge, beta being from 0.3 to 0.7, preferably 0.55, then step 708 follows to turn on the screen flag for the next edge, then proceed to the next edge. If no, the edge is not a wider edge, and step 730 follows to check whether the spacing from the prior edge of the same gradient polarity is greater than two times the minimum edge gap (or a different predetermined number) plus sharp_edge_width and the immediate prior edge of an opposite polarity, if any, is more than the minimum edge gap away. If yes, step 710 follows to turn off the screen flag for the next edge. If no, keep the screen flag and the screen threshold for the next edge and proceed to the next edge. Beta may be a predetermined fraction, or it may be a fraction calculated following a predetermined formula, such as a function of an edge width. In the latter case, beta may vary from one part of the image to another part.

Alternative Embodiments

Orientation of the Pixel Grid

The image input by the focus signal generator 120 may have pixels laid out in a rectangular grid ("pixel grid") rotated at 45 degrees with respect to a rectangular frame of the image. In this case, the X- and Y-directions of the edge detection operations and width measurement operations may be rotated likewise.

Edge-Sharpness Measures:

In the above description, sharpness of image of an edge is represented by a width of the edge measured from a sequence of gradients across the edge with the gradients being perpendicular to the edge, there are alternatives that work on similar principle. In essence, what allows the focus signal generated in this manner is that the individual edges contributes a quantity (hereinafter "edge-sharpness measure") that is independent of scaling the image data by, for example, 20%, or essentially independent, such as changes by not more 5% for 20% scaling down of the image data, thus helping to make the focus signal independent of or far less dependent on illumination of the scene of the image or reflectivity of objects in the scene compared with the conventional contrast detection method.

In the present focus signal generator 120, any edge-sharpness measure that has the above characteristic of being independent of or essentially independent of 20% scaling down of the image data in addition is a good alternative to the width measured from a gradient or interpolated gradient to another gradient or interpolated gradient of a same gradient value.

The alternative edge-sharpness measure preferably has a unit that does not include a unit of energy. The unit of the edge-sharpness measure is determined on basis two points: (a) each sample of the image data on which the first-order edge-detection operator operates on has a unit of energy, (b) distance between samples has a unit of length. On basis of points (a) and (b), a gradient value has a unit of a unit of energy divided by a unit of length. Likewise, contrast across the edge or across any undivided portion of the edge has a unit of energy. Therefore the contrast is not a good edge-sharpness measure, as the unit reveals that it is affected by illumination of the scene and reflectivity of the object. Neither is peak gradient of the edge, because the unit of the peak gradient has a unit of energy in it, indicating also that it is responsive to a change in illumination of the scene. On the other hand, peak gradient of the edge divided by a contrast of the edge is a good edge-sharpness measure, as it has a unit of the reciprocal of a unit of length. As another example, the count of gradients whose gradient values exceeds a certain predetermine fraction of the peak gradient is a good edge-sharpness measure, as the count is simply a measure of distance quantized to the size of the spacing between contiguous gradients, hence having a unit of length.

It is here noted that, in the generation of the edge-sharpness measure, a gradient may be generated from a first-order edge detection operator used to detect the edge, or may be generated from a different first-derivative operator (i.e. gradient operator). For example, while the Sobel operator (or even a second-order edge detection operator, such as a Laplacian operator) may be used to detect the edge, the Roberts operator whose kernels are simply [−1, +1] and its transpose, which is simply subtracting one sample of the image data from the next sample in the orientation of the gradient operator, with the resulting gradient located midway between the two samples. Edges may be detected with a higher-order edge detection operator than first-order independently of one or more derivative operators used in generating the edge-sharpness measure or any of the shape measures described in the next section.

Viewing it another way, the edge-sharpness measure should have a unit of a power of a unit of length, for example a square of a unit of length, a reciprocal of a unit of length, the unit of length itself, or a square-root of a unit of length.

Any such alternative edge-sharpness measure can replace the edge width in the focus signal generator 120.

To correct for a slant of the edge, the correction factor as described above with reference to FIGS. 6A-6D and FIG. 7 (hereinafter "width correction factor") should be converted to adopt the same power. For example, if the edge-sharpness measure is peak gradient divided by a contrast, which gives it a unit of the reciprocal of a unit of length, then the appropriate correction factor for the edge-sharpness measure is the reciprocal of the correction factor described with reference to FIGS. 6A-6D and FIG. 7 above. As another example, if the edge-sharpness measure has a unit of a square of a unit of length, then the slant correction factor for the edge-sharpness measure should be a square of the width correction factor.

Several examples of alternative edge-sharpness measures are described below with reference to the drawings in FIGS. 24A-D.

Figure 24A:
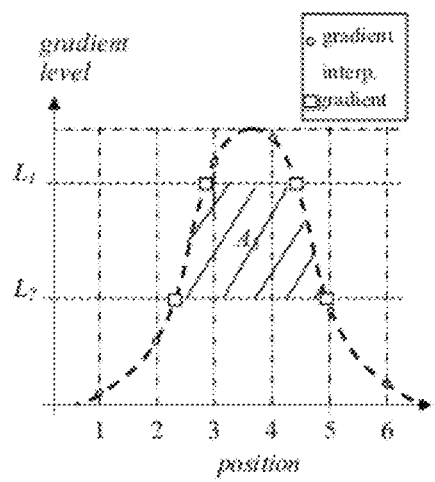
FIG. 24A illustrates a sequence of second derivatives of an image signal across an edge plotted against distance in multiples of a spacing between successive second derivatives, showing (a) a width $W_s$ between a pair of positive and negative peaks, (b) a width $W_1$ between a pair of outermost interpolated second derivatives that have a given magnitude $h_1$, (c) a width $W_2$ between an inner pair of interpolated second derivatives that have the given magnitude $h_1$, and (d) a distance $D_1$ from a zero-crossing (between the pair of positive and negative peaks) to an outermost interpolated second derivative that has the given magnitude $h_1$.
Figure 24B:
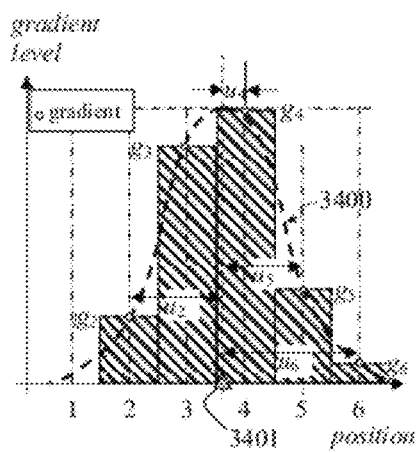
FIG. 24B illustrates a sequence of image data samples of the image signal plotted against distance in multiples of a spacing between successive samples, showing (a) a width $W_{edge}$ and a contrast $C_{edge}$ between two samples at two ends of the edge, (b) a peak gradient value $g_{peak}$ between a pair of samples that has a steepest change of sample value, (c) an undivided portion of the edge that has contrast $C_1$ and width $W_{part1}$, and (d) an undivided portion of the edge that has contrast $C_2$ and width $W_{part2}$.
Figure 24C:
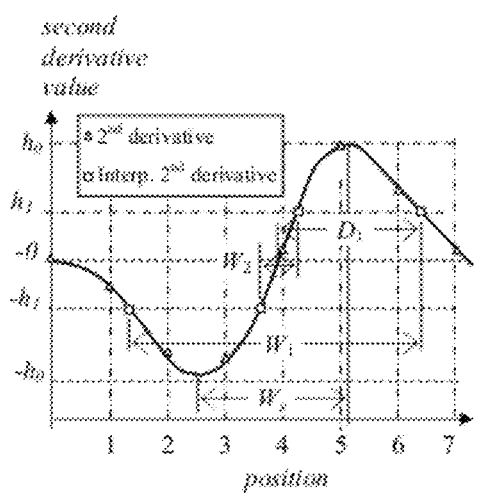
FIG. 24C illustrates a sequence of gradients across an edge plotted against distance in multiples of a spacing between successive gradients, and an area of a region under the plotted sequence of gradients.

FIG. 24C illustrates a sequence of gradients across an edge plotted against distance in multiples of a spacing between successive gradients, and an area $A_3$ of a shaded region under the plotted sequence of gradients. In this example, the region is defined between two gradient levels $L_1$ and $L_2$, which may be defined with respect to an interpolated peak gradient value (alternatively, the peak gradient value) of the sequence of gradients as, for example, predetermined portion of the interpolated peak gradient value. The shaded region has four corners of interpolated gradients. The area divided by the interpolated peak gradient value (alternatively, the peak gradient value) is a good edge-sharpness measure, as it has a unit of length. It is noted that alternative definitions of the region are possible. For example, the region may be bounded from above not by the gradient level $L_1$ but by the sequence of gradients.

Figure 24D:
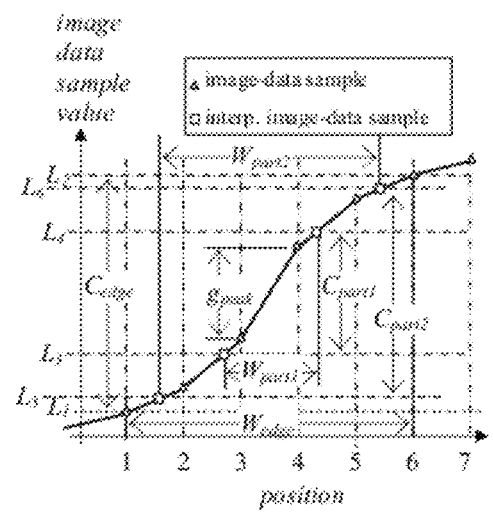
FIG. 24D illustrates a sequence of gradients of an image signal across an edge plotted against distance in multiples of a spacing between successive gradients, a center of gravity (i.e. center of moment), and distances of the gradients from the center of gravity.
Figure 25:
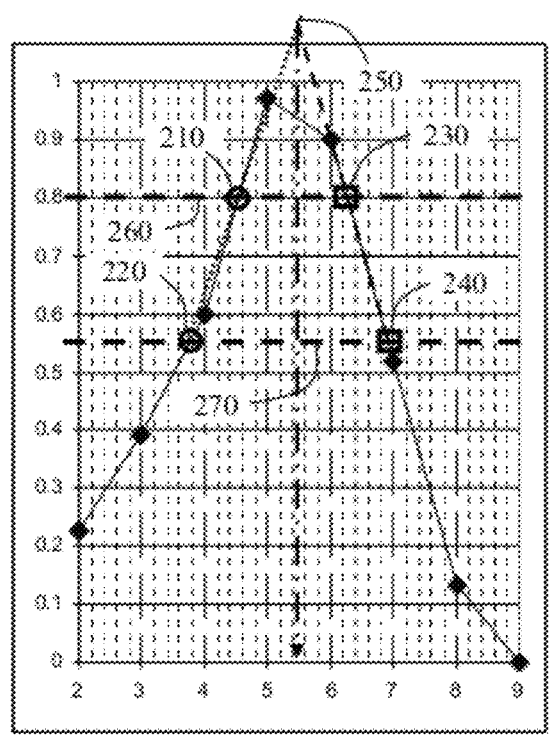
FIG. 25 illustrates finding an interpolated peak's position by interpolation.

FIG. 24D illustrates a sequence of gradients of samples of the image data across an edge plotted against distance in multiples of a spacing between successive gradients, a center of gravity 3401 (i.e. center of moment), and distances $u_2$, $u_3$, $u_4$, $u_5$ and $u_6$ of the gradients (having gradient values $g_2$, $g_3$, $g_4$, $g_5$ and $g_6$) from the center of gravity. A good edge-sharpness measure is a k-th central moment of the gradients about the center of gravity, namely a weighted average of the distances of the gradients from the center of gravity with the weights being magnitudes of the respective gradients, k being an even integer. For example, k can be 2, which makes the edge-sharpness measure a variance as if the sequence of gradients were a probability distribution. In this example, the edge-sharpness measure has a unit of a square of a unit of length. More generally, the edge-sharpness measure may be a function of distances of a plurality of gradients of a sequence of gradients from a position predefined relative to the plurality of gradients, the sequence being array across the edge. Other than the center of gravity, the predefined position may be an interpolated peak position for the sequence of gradients. A proper subset of the gradients of edge may be chosen according to a predefined criterion to participate in this calculation. For example, the gradients may be required to have gradient values at least a predetermined fraction of the peak gradient or gradient value of an interpolated peak of the sequence of gradients.

FIG. 24A illustrates a sequence of second derivatives of a sequence of samples of image data across an edge plotted against distance in multiples of a spacing between successive second derivatives, showing (a) a width $W_s$ between a pair of positive and negative peaks, (b) a width $W_1$ between a pair of outermost interpolated second derivatives that have a given magnitude $h_1$, (c) a width $W_2$ between an inner pair of interpolated second derivatives that have the given magnitude $h_1$, and (d) a distance $D_1$ from a zero-crossing (between the pair of positive and negative peaks) to an outermost interpolated second derivative that has the given magnitude $h_1$. Any one of the three widths $W_s$, $W_1$ and $W_2$ may used as the edge-sharpness measure.

In the example of FIG. 24A, furthermore, the edge-sharpness measure may be a weighted sum of distances from the zero-crossing (between the pair of positive and negative peaks, and may be interpolated) of the second derivatives with the weights being magnitudes of the respective second derivatives. More generally, the edge-sharpness measure may be a function of distances of a plurality of second derivatives across the edge from a predefined position relative to the plurality of second derivatives. Other the zero-crossing position, a center of gravity is a good candidate for the predefined position, with the weights being magnitudes of the second derivatives. Yet another good candidate for the predefined position may be the midway point between the pair of positive and negative gradients.

FIG. 24B illustrates a sequence of samples of image data from pixels of an edge plotted against distance in multiples of a spacing between contiguous pixels, showing (a) a width $W_{edge}$ and a contrast $C_{edge}$ between two samples at two ends of the edge, (b) a peak gradient value $g_{peak}$ (generated by the Roberts operator) between a pair of samples that has a steepest change of sample value, (c) a narrowest undivided portion of the edge that has contrast $C_1$ and width $W_{part1}$ and (d) a narrowest undivided portion of the edge that has contrast $C_2$ and width $W_{part2}$. As mentioned before, the peak gradient value $g_{peak}$ divided by the contrast $C_{edge}$ is a good edge-sharpness measure. The width $W_{edge}$ is another good edge-sharpness measure. The widths $W_{part1}$ and $W_{part2}$ are also good alternatives. The contrasts $C_1$ and/or $C_2$ may be defined to be a predetermine portion of the edge contrast $C_{edge}$. I Alternatively, any one of them may be defined to be a predetermined multiple of a peak gradient of the edge, such as the peak gradient $g_{peak}$. It is also noted here that the "narrowest undivided portion" may be delimited by interpolated samples of image data, such as shown in squares in FIG. 24B, or by rounding down or up to a nearest pixel count.

Qualifying Edges

The below method of qualifying of edges may be performed in the Edge Detection & Width Measurement Unit 206 and is described below with reference to FIGS. 27-35.

In this method, the gradient profile is compared with a sequence of reference gradients. Each of the reference gradients has a gradient value and a spacing to the next reference gradient in the sequence. The reference gradients are generated under a predefined relationship between them. For example, the sequence may be generated from and/or stored as a sequence in a lookup table. As another example, the sequence may be defined by way of a mathematical formula stored in a non-volatile memory.

Figure 27:
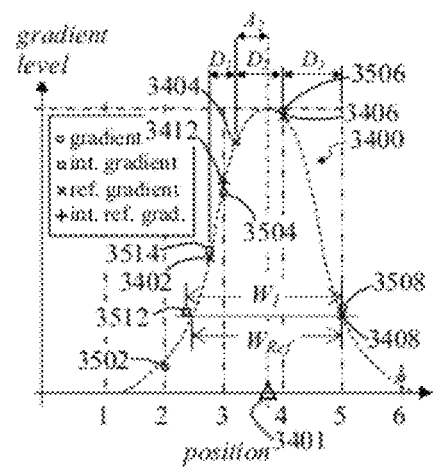
FIG. 27-29 illustrate gradient sequences alongside gradient profiles.
Figure 28:
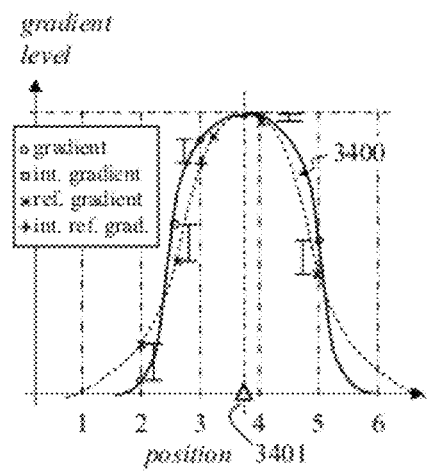
Figure 29:
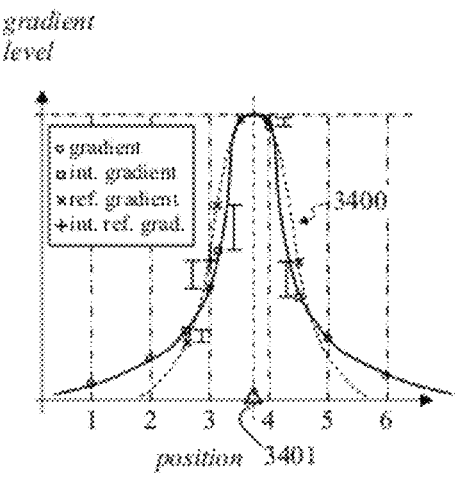

FIG. 27 illustrates a sequence of reference gradients 3402, 3404, 3406, 3408 plotted along with a gradient profile consisting of gradients 3502, 3504, 3506, 3508 (markers "x") at positions 2, 3, 4 and 5, respectively. Reference gradient 3402 has a spacing D1 to the next reference gradient 3404. Reference gradient 3404 has a spacing D2 to the next reference gradient 3406. Reference gradient 3406 has a spacing D3 to the next reference gradient 3408. The reference gradients 3402, 3404, 3406 and 3406 fall on a bell-shaped reference gradient curve 3400 (dotted curve) that has a reference peak position 3401 between positions 3 and 4. The reference gradient curve 3400 represents what value a reference gradient should take given its distance from the reference peak position 3401.

The reference gradient curve 3402 may be defined via a mathematical formula stored in a non-volatile memory. The formula may use different mathematical expressions for different sections of the reference gradient curve 3402. For example, it may use a hyperbola formula to define a range from a reference peak of the reference gradient curve 3402 to 50% down from the reference peak, and a third degree polynomial on each side of the curve to define a range further down from 50% below the reference peak. Preferably, the mathematical formula is parameterized by (or associated with) one or more parameters, for example any one or more among a reference width, an edge slant angle (that can be used to match a slant angle of an edge), a peak gradient level, a zoom factor (of a zoom lens on the camera), an aperture size (of the lens of the camera), etc. Coefficients that define the formula may be stored in a lookup table (e.g. in a nonvolatile memory, or loaded into a read-writable memory such as an SRAM or a DRAM from a nonvolatile memory) and indexed (i.e. keyed) by various combinations of the parameter values.

Alternatively, the reference gradients may be defined via and/or in a lookup table. The lookup table may specify more than one sequence. Each sequence is specified in the lookup table with a gradient value for each reference gradient and a spacing to the next reference gradient value in the sequence. If the spacing is constant throughout the sequence, it may be specified once only for the entire sequence. If the spacing is constant for the entire lookup table for all sequences, it may be specified once only for the lookup table. Alternatively, the spacing may assume a default value, for example, 1.0. A reference peak may be specified for the sequence, to have a peak gradient level and a relative position (i.e. spacing and whether it is before/after) to a reference gradient in the sequence.

Further reference gradients may be interpolated from the reference gradients generated directly from the source (e.g. the lookup table or the mathematical formula) as a predefined reference sequence generator. It may be useful to interpolate a reference gradient to where the gradient profile has a steep slope. For example, in FIG. 27, interpolated reference gradient 3412 (marker "+") is interpolated from the reference gradients 3402, 3404, 3406 to be at position 3 where the gradient 3504 is. Interpolated reference gradients are likewise marked "+" in FIGS. 28-35.

On the other hand, gradients may be interpolated from the gradient profile to where a reference gradient is positioned relative to the gradient profile. It may be useful to interpolate an interpolated gradient to where a reference gradient is. For example, interpolated gradient 3514 (marker "□") is interpolated from gradients 3502, 3504, 3506 to be near reference gradient 3402. Interpolated gradients are likewise marked "□" in FIGS. 28-35.

The lookup table may store a plurality of sequences, each for a different combination of parameter values. Each sequence may be parameterized by (or associated with) one or more parameters, for example any one or more among a reference width, an edge slant angle, a peak gradient level, a zoom factor (of a zoom lens on the camera), an aperture size (of the lens of the camera), etc. For example, a sequence stored in the lookup table may correspond to a zoom factor of 2 times, an aperture of F3.5, a width of 4.5 at 50% down from peak, an edge slant angle of 30 degrees, whereas another sequence may correspond to a zoom factor of 0.5 times, an aperture of F2.8, a width of 3.7 at 50% down from peak, and an edge slant angle of 0 degree.

The lookup table may be stored in a memory, which may be a RAM (SRAM or DRAM) or a non-volatile memory, for example a flash memory, or simply a bank of registers. The lookup table may be stored on a nonvolatile memory outside the focus signal generator but within the image capture system 102.

A shorter sequence may be extracted from a sequence stored in the lookup table such that the extracted sequence consists of a proper subset of the reference gradients of the sequence stored in the lookup table. Spacings between the extracted reference gradients, as well as other data such as the relative positions of the extracted reference gradients with respect to the reference peak may be extracted along. For example, a sequence of 30 reference gradients stored in the lookup table may have a uniform spacing of 0.2 between successive reference gradients and may have a reference peak that coincides with the $16^{th}$ reference gradient in the sequence, whereas an extraction extracts the $7^{th}$, the $13^{th}$ and the $22^{nd}$ reference gradients to form a shorter sequence consisting of these three reference gradients. In the extracted sequence of this example, a spacing from the first reference gradient to the second reference gradient is 1.2, a spacing from the second reference gradient to the third reference gradient is 1.8, and the reference peak is noted to lie between the second and third reference gradients and at a spacing of 0.6 from the second reference gradient.

Figure 30:
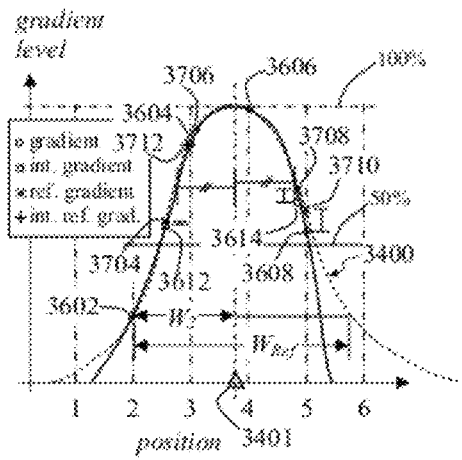
FIG. 30 shows a sequence of reference gradients fitted to a gradient profile from peak to only 50% down.
Figure 31:
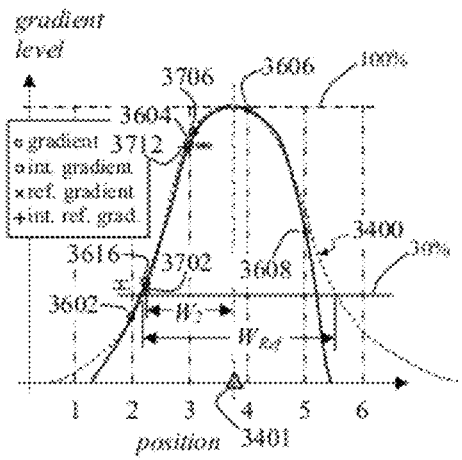
FIG. 31 shows a sequence of reference gradients fitted to the gradient profile of Figure bbb to only one side instead and from peak to 70% down.

The sequence of reference gradients may be curve-fitted to the gradient profile or a portion thereof. For example, the sequence may be fitted to the gradient profile from the peak gradient and 50% down, as FIG. 30 shows, to both sides of a peak gradient. As another example, the sequence may be fitted to at least two gradients on one side of a peak gradient of the gradient profile but to no gradient on the other side of the peak gradient, such as from the peak gradient to 70% down from the peak gradient, as FIG. 31 shows. Preferably, at least one reference gradient has gradient value above 70% of the gradient level of the peak gradient (alternatively, of the interpolated peak gradient). More preferably, it is above 85%. Also, preferably at least one reference gradient has gradient value below 70%, and more preferably, below 50% of the peak gradient (alternatively, of the interpolated peak gradient). All the reference gradient values may be multiplied by a scaling factor to improve the curve-fitting. All the gradient values fitted to may be multiplied by a scaling factor to improve the curve-fitting.

Figure 32:
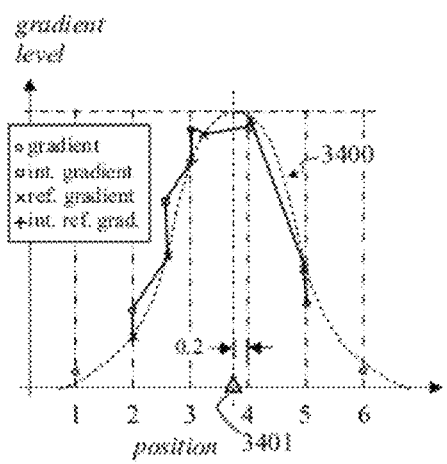
FIG. 32 shows a sequence of reference gradients aligned to gradients within a gradient profile under a first alignment, with spacing=0.2 between nearest pair of gradient and reference gradient.
Figure 33:
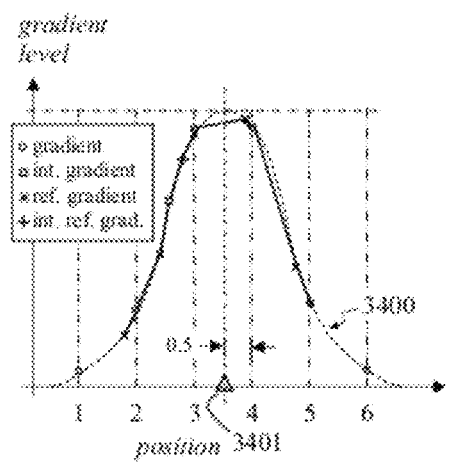
FIG. 33 shows the sequence aligned to the gradients under a second alignment, with spacing=0.5 between nearest pair of gradient and reference gradient, resulting in shorter total length of line segments.

All the reference gradients may be shifted in position together relative to the gradient profile to achieve a better curve-fitting. For example, a gradient profile may have a first, a second, a third and fourth gradients and may have a uniform spacing of 1.0 from one gradient to the next, whereas a sequence of reference gradients consisting of a first, a second, a third and a fourth reference gradients and having a uniform spacing of 1.0 from one reference gradient to the next may be positioned relative to the gradient profile such that the first reference gradient is between the first and second gradients and at spacing of 0.2 from the first gradient, the second reference gradient is between the second and third gradients and at spacing of 0.2 from the second gradient, and so on, as shown in FIG. 32, or the sequence may be positioned such that the first reference gradient's spacing to the first gradient is 0.5, the second reference gradient's spacing to the second gradient is 0.5, and so on, as shown in FIG. 33. The latter results in a better curve-fitting where a curve-fitting criterion specifies that the better curve-fitting reduces the total length of line segments (thick, solid lines) that join nearest pairs of gradients/reference gradients. Alternative criteria to find better curve-fitting are available. For example, an alternative is to interpolate reference gradients to pair with the gradients (or vice versa) and take a sum of the squares of differences between the gradients (reference gradients) and the paired reference gradients (paired gradients). The gradient and the reference gradient within each pair need not necessarily share exactly the same position, but preferably are spaced apart at 0.25 or less, and more preferably at 0.1 or less. Still other alternatives are possible.

If a reference peak location is provided along with the sequence of reference gradients, the sequence may be aligned to the gradient profile by aligning the reference peak to a position determined from the gradient profile in a predetermined manner. There are more than one way to determine this position. In one way, this position can be a midpoint between two gradient(s)/interpolated gradient(s), one on each of the two sides of the gradient profile at a predetermined gradient level, which may be specified as a predetermined percentage down from the gradient level of the peak gradient or an interpolated peak, as shown in FIG. 34. In FIG. 34, the reference peak position 3401 is made to coincide with a midpoint between gradient 3802 and interpolated gradient 3824. In another way, the reference peak may be aligned to an interpolated peak position, as FIG. 35 shows. More generally or alternatively, the sequence may be aligned to the gradient profile in such a way that the reference peak is located between a pair of gradients, such as gradients 3804, 3806 in FIG. 34 that flank the midpoint (alternatively, the interpolated peak).

The gradient profile is compared with the sequence to generate a comparison result under a predefined manner, which may or may not be same or similar to that for the criterion of curve-fitting. Interpolated gradients/reference gradients may be included in the comparison, especially where doing so can improve precision and/or accuracy for the comparison. One approach to the comparison is to evaluate how a quantity measured from the gradient profile relates to a quantity associated with the sequence. For instance, a width of the gradient profile may be compared with a reference width of the sequence. Both widths may be measured at a gradient level, which may be predetermined as a predetermined percentage down from the peak gradient or an interpolated peak. For example, in FIG. 27, the reference width $W_{Ref}$ and a gradient profile width $W_1$ (measured between interpolated gradient 3512 and gradient 3508) both refer to a same gradient level (horizontal dotted line). Alternatively, they may be measured at different gradient levels. For example, the reference width may be expected to be, ideally, 70% that of the gradient profile's width, where the reference width corresponds to a width of the reference gradient curve at 30% down from the reference peak of the reference gradient curve whereas the gradient profile's width is measured at 50% down from the peak gradient or an interpolated peak of the gradient profile. The reference width may be provided by the reference sequence generator along with the sequence by retrieving it from a non-volatile memory. Alternatively, it may be computed from the sequence. The comparison may report a yes/no binary result on basis of how well the two quantities relate to each other, such as how far an expected value of one quantity given the other quantity departs from the actual value of the one quantity. In the above example where reference width and gradient profile width are both measured at a same percentage down from a peak gradient or interpolated peak, a difference between the widths may be compared with a predetermined percentage of one of the widths. Alternatively, the comparison may result in a comparison result that can take any one of more than two values and that reports a quantity that ranges from a level representing high similarity to a level representing high dissimilarity, with other level(s) to represent intermediate levels of dissimilarity/similarity between them.

Another approach to compare the gradient profile and the reference sequence is to compare between individual gradient and reference gradient in pairs. As shown in FIG. 27, gradients/interpolated gradients 3514, 3504, 3506, 3508 are paired up with reference gradients/interpolated reference gradients 3402, 3412, 3406, 3408, respectively. Arithmetic differences between the former and the latter are evaluated, and a final result of comparison on basis of one or more of such comparisons (e.g. arithmetic differences) is reported in a binary, yes-or-no manner, or is reported in a multi-step, graded manner such that different grades of similarity or dissimilarity are reported. For example, in FIGS. 28 and 29, next to each pair (among five pairs) of gradient and reference gradient (either or both may be interpolated), an "I" marker is placed to indicate how much their gradient levels are apart. The gradient and reference gradient within each pair need not necessarily share exactly the same position, but preferably are within 0.25 of each other, and more preferably within 0.1 of each other. The comparison may report a binary result or a graded result on basis of the largest among the five differences of gradient levels. Alternatively, the comparison may do so on basis of a square-root of a sum across squares of the five differences. There are other possible ways to represent quantitatively the deviation of the five gradients from the reference gradients that can occur to one of ordinary skill. To report a binary result, a graded result, such as described above, that arises from one or more of such differences may be compared with a predetermined threshold.

One or more sequences may be selected to curve-fit the gradient profile. If more than one sequence is selected, a sequence that best fits the gradient profile may be chosen to have its comparison result reported. Sequence(s) may be selected on basis of one or more parameters associated with the gradient profile. An example is a width of the gradient profile measured at a predetermined percentage down from the peak gradient or an interpolated peak. Another example is a one-sided width of the gradient profile measured from an interpolated peak position (or a midpoint between two interpolated gradients of same gradient value) to a gradient/interpolated gradient at a predetermined percentage down from the peak gradient or the interpolated peak. A third example is a slant angle of an edge associated with the gradient profile or giving rise to the gradient profile. A fourth example is an area under the gradient profile (down to a certain percentage down from the peak/interpolated peak). A fifth example is a spacing of the interpolated peak position from the peak gradient. A sixth example is a zoom lens zoom factor. A seventh example is a size of lens aperture.

If the comparison result indicates that there is dissimilarity beyond a threshold, the focus signal generator may de-emphasize or reject altogether an edge associated with the gradient profile and its edge width from entering a calculation for a focus signal or edge count or focus control.

As shown in an embodiment in FIG. 36, a parameter extractor receives the gradients of the image and outputs one or more parameter(s) extracted from a gradient profile among the gradients to a sequence selector, which converts the one or more parameter(s) to address(es). These address(es) are received by the reference sequence generator, which in response outputs one or more sequences of reference gradients (or one or more series of parameters that define the corresponding reference gradient curves from which reference gradients are computed) to an evaluation unit. The evaluation unit performs the curve-fitting and the comparison to generate the comparison result. Extracted parameters, such as edge slant angle and edge width, are input to the evaluation unit. The evaluation unit comprises an arithmetic circuit to perform the curve-fitting and/or comparison. The evaluation unit may further comprise a memory couple to the arithmetic circuit. These blocks are part of the Edge Detection & Width Measurement Unit 206. One or more among the sequence/curve generation, the curve-fitting and the comparison may be executed under control of computer instructions stored in a nonvolatile memory in the image capture system 102. The above method may be performed in the Edge Detection & Width Measurement Unit 206. One or more of the blocks may be implemented in the form of circuit. One or more of the blocks may be implemented in the form of computer instructions and is (are) executed on one or more processors.

Figure 23A:
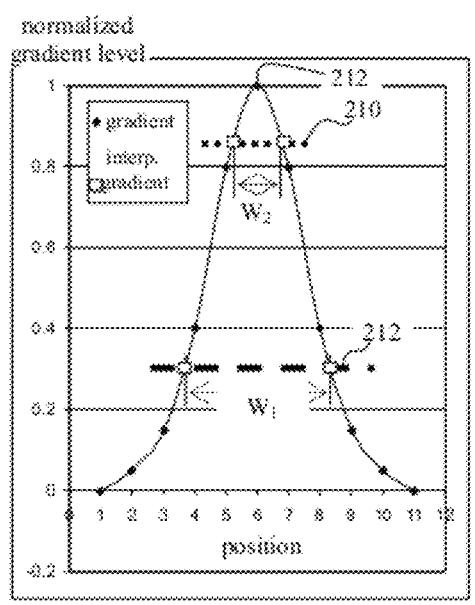
FIG. 23A illustrates a gradient of an image signal across two adjacent edges of opposite polarities (i.e. signs) where the edges do not interact.
Figure 23B:
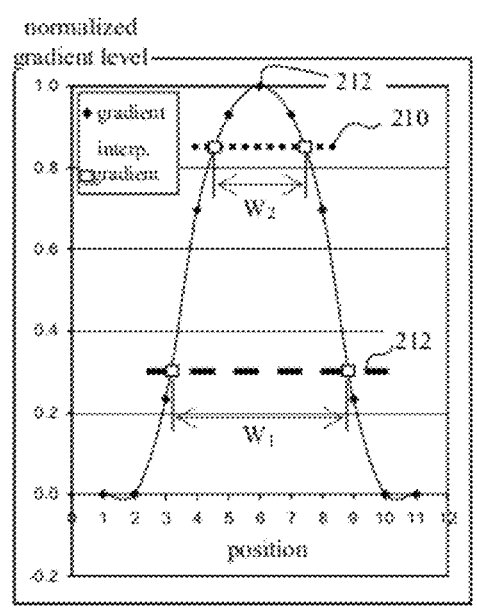
FIG. 23B illustrates a gradient of an image signal across two adjacent edges of opposite polarities (i.e. signs) where the edges interact.

It is noted that, in this disclosure, a quantity from an edge, such as a gradient level, is said to be normalized when it is divided by, by default unless otherwise specified, either a peak gradient value of the edge or gradient value of an interpolated peak. For example, in FIG. 23B, peak gradient 3212 has a normalized value of exactly 1, whereas in FIG. 24C the interpolated peak 3270 is different from the peak gradient 3212, and the gradients shown in FIG. 24C are normalized with respect to the interpolated peak 3270, not the peak gradient 3212.

Where the edge contributes to the focus signal, the edge-sharpness measure is a quantity whose unit is a positive or negative, integer or non-integer power of a unit of length. It may be measured from the edge and/or a reference sequence/curve matched to the edge in any manner described under the preceding section under the heading of "Edge-sharpness measures," or may be retrieved for a matched reference sequence/curve from a non-volatile memory.

Length Filter

Below describes a function of length filter 212. Broadly defined, length filter 212 creates a preference for edges that each connects to one or more edges of a similar orientation. A group of edges that are similarly oriented and mutually connected within the group ("concatenated edge") is less likely to be due to noise, compared with an isolated edge that does not touch any other edge of similar orientation. The more edges of a similar orientation thus concatenated together, the lesser the chance of them being due to noise. The probability of the group being due to noise falls off exponentially as the number of edges within the group increases, and far faster than linearly. This property can be harnessed to reject noise, especially under dim-lit or short-exposure situations where the signal-to-noise ratio is weak, e.g. less than 10, within the image or within the region of interest. The preference may be implemented in any reasonable method to express such preference. The several ways described below are merely examples.

A first method is to eliminate edges that belong to vertical/horizontal concatenated edges having lengths lesser than a concatenated length threshold. The concatenated length threshold may be larger when the region of interest is dimmer. For example, the concatenated length threshold may start as small as 2, but increases to 8 as a signal-to-noise ratio within the region of interest drops to 5. The concatenated length threshold may be provided by the processor 112, 112', 112", for example through a 'length command' signal, shown in FIG. 3, as part of signals 132. Alternately, the threshold may be calculated according to a formula on the focus signal generator.

A second method is to provide a length-weight in the length filter 212 for each edge and apply the length-weight to a calculation of focus signal in the focus signal calculator 210. An edge that is part of a longer concatenated edge receives a larger weight than one that is part of a shorter concatenated edge. For example, the length-weight may be a square of the length of the concatenated edge. Thus, a contribution of each edge towards the focus signal may be multiplied by a factor A/B before summing all contributions to form the focus signal, where B is a sum of the length-weights of all edges that enter the focus signal calculation, and A is a length-weight of the edge. Likewise, the edge-width histogram, which may be output as part of signals 134, may have edges that are members of longer concatenated edges contribute more to the bins corresponding to their respective edge width, thus preferred, instead of all edges contribute the same amount, e.g. +1. Thus, for example, each edge may contribute A/C, where C is an average value of A across the edges. Similarly, the narrow-edge count may have edges that are members to longer concatenated edges contribute more. Thus, for example, the contribution from each edge may be multiplied by A/D, where D is an average of A among edges that are counted in the narrow-edge count.

A group of N vertical (horizontal) edges where, with the exception of the top (leftmost) and the bottom (rightmost) ones, each edge touches two other vertical (horizontal) edges, one above (to the left of) itself, the other below (to the right of) itself, is a vertical (horizontal) concatenated edge of length N.

The top (leftmost) edge needs only touch one edge below (to the right of) itself. The bottom (rightmost) edge needs only touch one edge above (to the left of) itself.

FIG. 8 illustrates a vertical concatenated edge and its length. In FIG. 8, cells R2C3 and R2C4 form a first vertical edge, cells R3C3, R3C4, and R3C5 together form a second vertical edge, and cells R4C4 and R4C5 together form a third vertical edge. The first and the third vertical edges each touches only one other vertical edge, whereas the second vertical edge touches two other vertical edges. The first, second and third vertical edges together form a vertical concatenated edge having a length of 3.

In a situation (not shown) where a vertical (horizontal) concatenated edge has two or more branches, i.e. having two edges in a row (column), the length may be defined as the total number of edges within the concatenated edge. Alternately, the length may be defined as the vertical (horizontal) distance from a topmost (leftmost) edge therein to a bottommost (rightmost) edge therein plus one.

There are other possible ways to define a concatenated length other than the above proposals. For example, a definition of a length for a concatenated edge shall have a property that the length is proportional to the number of member edges within the concatenated edge at least up to three. This is to be consistent with the previously stated reasoning that more edges being mutually connected by touching each other exponentially reduces a probability that the concatenated edge is caused by a noise, and as such the length should express a proportionality to the number of member edges within the concatenated edge up to a reasonable number that sufficiently enhances a confidence in the concatenated edge beyond that for a single member. The length filter 212 may de-emphasize or eliminate and thus, broadly speaking, discriminate against an edge having a concatenated length of one. The length filter 212 may discriminate against an edge having a concatenated length of two. The length filter 212 may discriminate against an edge having a concatenated length of three, to further reduce an influence of noise. The length filter 212 may do any one of these actions under a command from the processor.

Although shown in FIG. 3 to immediately follow the Edge Detection & Width Measurement Unit 206, other arrangements are possible. For example, the Length Filter 212 may be inserted before the focus signal calculator 210, wherein the edges processed by the Length Filter 212 are those that pass through the width filter 209 depending on the 'fine' signal.

In an alternate embodiment of a focus signal generator, the fine switch 220 may be removed so that the focus signal calculation unit 210 receives a first set of data not filtered by the width filter 209 and a second set filtered, and for each calculates a different focus signal, gross focus signal for the former, fine focus signal for the latter, and outputs both to the processor 112, 112'.

Width Filter

Figure 11:
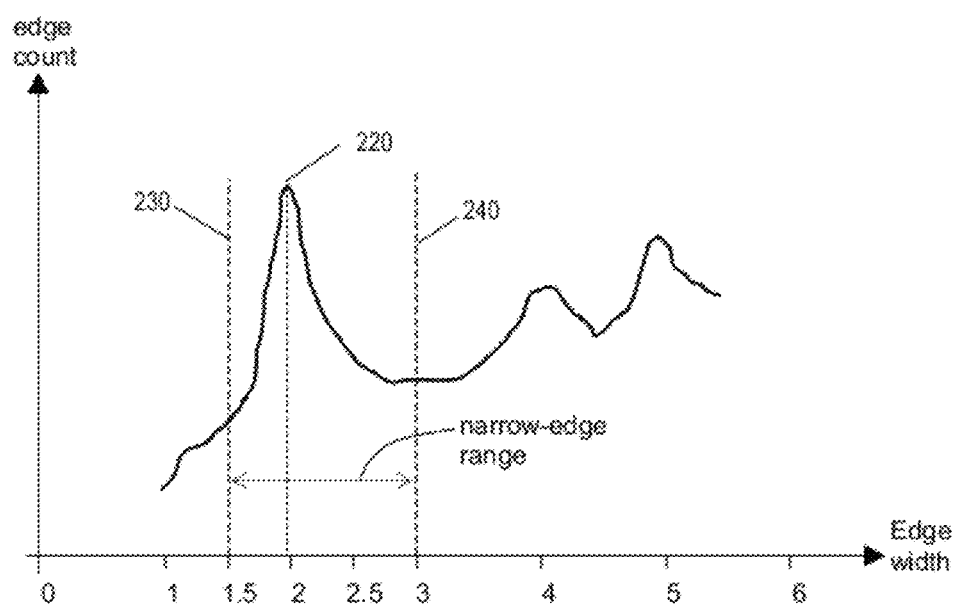
FIG. 11 is a histogram of edge widths illustrating a range of edge widths for calculating a fine focus signal.

Refer next to FIG. 3 to understand an operation of the Width Filter 209. FIG. 11 plots a histogram of edge widths, i.e. a graph of edge counts against edge widths. At edge width of 2, i.e. the aforementioned sharp_edge_width, there is a peak, indicating a presence of sharp edges in the image. At edge widths of 4 and 5, however, there are peaks, indicating edges that are blurred, possibly due to the corresponding imaged objects being out of focus, being at a different distance away from the focus lens than those objects that give rise to the sharp edges. For calculating a focus signal, edges whose widths lie outside a predetermined range ("narrow-edge range") may be de-emphasized using the Width Filter 209. The Width Filter 209 may create a lesser weight for edge widths outside the narrow-edge range for use in the focus signal calculation. For example, edge widths may be assigned weight of 1.0, whereas edges widths more than +1 to the right of the upper limit 840 assigned a weight of 0, and edge widths in between assigned weights between 0 and 1.0, falling monotonically with edge width. Alternately, the Width Filter 209 may prevent such edges from entering the focus signal calculation altogether. Appropriate upper and lower limits 830, 840 depend on several factors, including crosstalk in the pixel array 108, the interpolation method used to generate missing colors for the image received by the focus signal generator 120, and the filter coefficients used in the lowpass filter employed in the Edge Detection and Width Measurement Unit 206. Appropriate upper and lower limits 830, 840 and the parameter sharp_edge_width may be determined for the image pickup apparatus 102, 102' by capturing images of various degrees of sharpness and inspecting the edge width histograms. For example, if a sharp image has a peak at edge width of 2, an appropriate lower and upper limit may be 1.5 and 3, respectively, and the sharp_edge_width may be set to 2.0. The lower and upper limits and sharp_edge_width may be determined as above and provided to the focus signal generator 120, 120', 120" by the processor 112, 112". When 'fine command' is ON, the fine focus signal thus calculated de-emphasizes edge widths outside the narrow-edge range.

In addition, the Width Filter 209 may calculate a total count of the edges whose edge widths fall within the narrow-edge range and output as part of output signals 134. Narrow-Edge Count may be input to and used by the focus system controller (processor 112) to detect a presence of sharp image and/or for initiating tracking.

Focus Signal

Referring next to the focus signal calculator 210 of FIG. 3, the focus signal calculator 210 receives edge widths and outputs a focus signal. The focus signal may be calculated as a weighted average of all the edge widths where the weights are the edge counts for each edge width, viz. focus signal=$\Sigma w_i e_i / \Sigma w_i$, where $e_i$ are the edge widths, $w_i$ are the weights, where here $w_i=c_i$, $c_i$ being the edge count at edge width $e_i$, i being a bin number of a histogram of edge widths. Alternately, the weight at each edge width may be the edge count for the edge width multiplied by the edge width itself, i.e. $w_i=c_i e_i$. In addition, preferences from the Width Filter 209 that are expressed in terms of weights may be further multiplied to each edge width. For example, for weights $\Omega_i$ produced by the Width Filter 209, $\Sigma \Omega_i = 1$, focus signal may be calculated as $\Sigma \Omega_i w_i e_i / \Sigma \Omega_i w_i$. If control signal 'fine' is ON and 'exclude' is OFF, the focus signal would be a value very close to the sharp edge width of 2.0 for the example shown in FIG. 11, indicating that among object details within the focus distance range that would produce edge widths between 2.0 and 3.0, most are actually in sharp focus. If control signal 'fine' is OFF and 'exclude' is OFF, the focus signal may be a value close to 5.0, indicating that there are substantial details of the image that are out of focus. Turning ON the fine switch 220 allows the focus signal to respond more to objects slightly blurred while less to those that are completely blurred. When the fine switch 220 is ON, we shall refer to the focus signal as a fine focus signal, whereas when the fine switch 220 is OFF, a gross focus signal. As aforementioned, the emphasis expressed by the Length Filter 212 may be incorporated into the focus signal in one of several ways, such as eliminating an edge that is de-emphasized from entering the focus signal calculation, or reducing a weight of the edge's contribution towards a count $e_i$ of a corresponding edge width bin.

Figure 15:
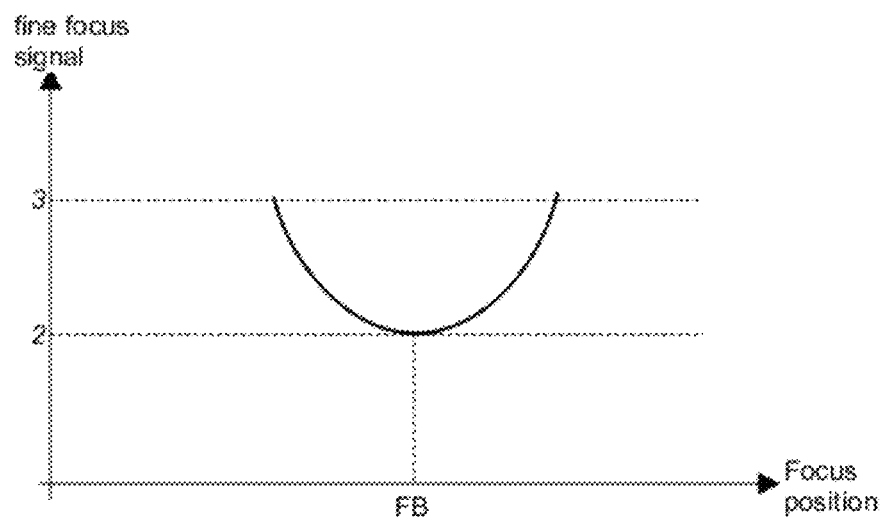
FIG. 15 is a graph illustrating a variation of a fine focus signal across a range of focus positions.

FIG. 15 sketches a response of the fine focus signal to an adjustment of the focus position in the vicinity of where an object is in sharp focus. The fine focus signal reaches a minimum value, approximately at sharp_edge_width, where the focus position brings an image into sharp focus, and increases if otherwise. The fine focus signal may be used for tracking objects already in-focus or very nearly so. For moving objects, the fine focus signal allows the focus control system to keep the objects in sharp focus even if the focus distance continues to change. Fine focus signal may also be used to acquire a sharp focus ("acquisition") of an object that is not yet in sharp focus but close enough such that the object gives rise to edges whose widths fall within the narrow-edge range. Since the edge width histogram exhibits a peak at the edge width corresponding to the object away from the sharp_edge_width, resulting in the fine focus signal being larger than the sharp_edge_width, the focus control system may respond by adjusting the focus position to bring the fine focus signal value towards the sharp_edge_width, thus centering the peak of edge width due to the object at the edge width value equal to sharp_edge_width.

Basic Use

FIGS. 12-16 illustrate how the narrow-edge count, gross focus signal, and fine focus signal may be used to perform focus control to achieve sharp images.

Figure 12:
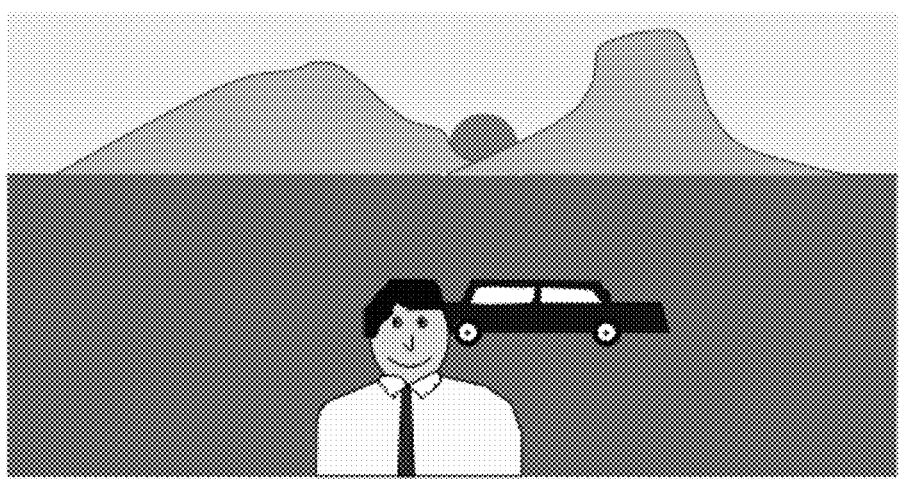
FIG. 12 is an illustration of a scene.

FIG. 12 illustrates an outdoor scene having 3 groups of objects at different focus distances: "person" in the foreground, "mountain, sun, and horizon" in the background, and "car" in the between.

Figure 13:
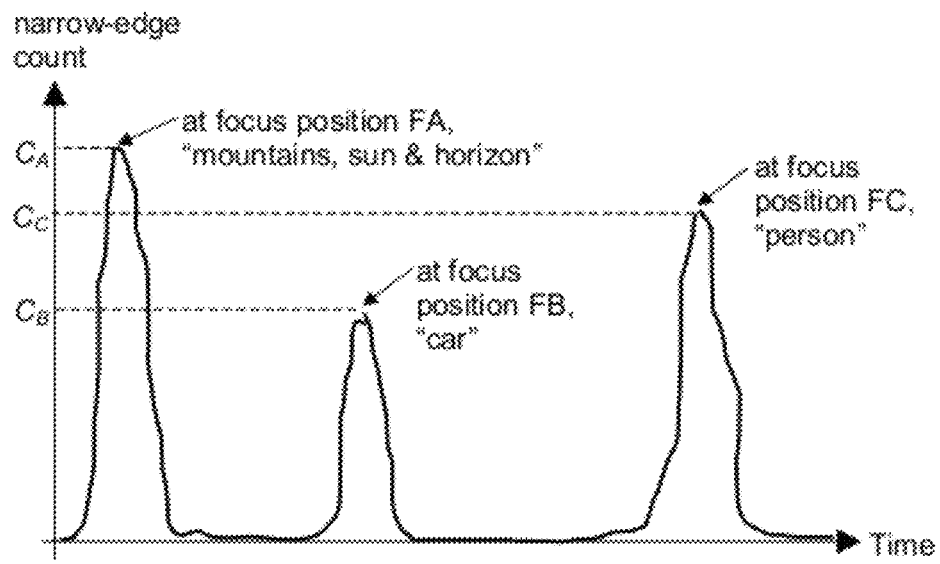
FIG. 13 is a graph illustrating a variation of a narrow-edge count during a focus scan of the scene of FIG. 12.

FIG. 13 is an illustration of the narrow-edge count plotted against time when the focus position of the focus lens 104 sweeps from far to near for the scene illustrated in FIG. 12. The narrow-edge count peaks when the focus position brings an object into a sharp image on the pixel array 108. Thus the narrow-edge count plot exhibits 3 peaks, one each for "mountain, sun, and horizon", "car", and "person", in this order, during the sweep.

Figure 14:
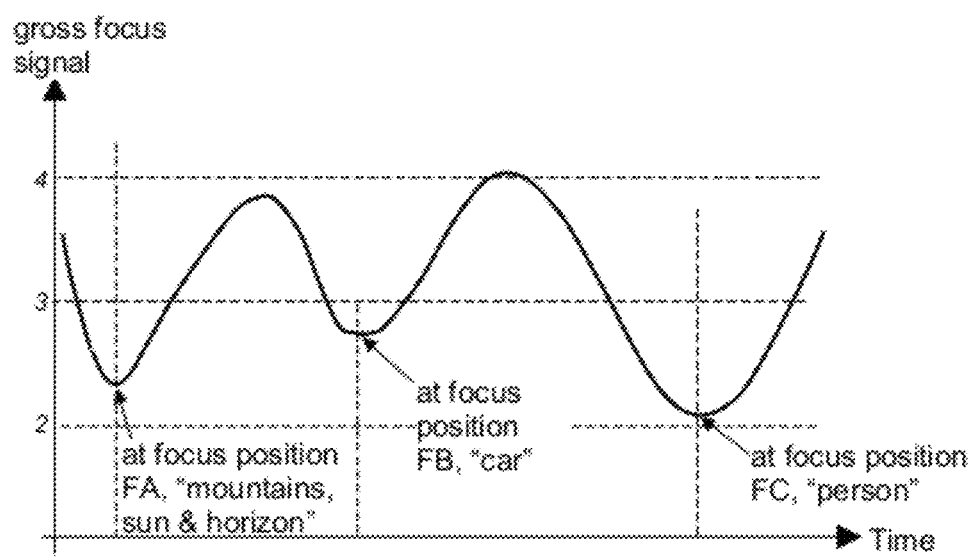
FIG. 14 is a graph illustrating a variation of a gross focus signal during a focus scan of the scene of FIG. 12.

FIG. 14 shows the gross focus signal plotted against time. The gross focus signal exhibits a minimum when the focus position is near each of the 3 focus positions where the narrow-edge count peaks. However, at each minimum, the gross focus signal is not at the sharp edge width level, which is 2.0 in this example, due to bigger edge widths contributed by the other objects that are out-of-focus.

FIG. 15 illustrates the fine focus signal plotted against the focus position in the vicinity of the sharp focus position for "car" in the scene of FIG. 12. The fine focus signal achieves essentially the sharp edge width, which is 2 in this example, despite the presence of blurred objects ("person" and "mountains, sun, and horizon"). Referring to FIG. 11 again, where two peaks at widths of 4 and 5 are contributed by those two groups of blurred objects, this can be understood as the Width Filter 324 having reduced the weight or eliminated altogether the contributions from the edge widths to the right of upper-limit 840.

A focus control system may use the gross focus signal to search for the nearest sharp focus position in a search mode. It can move the focus position away from the current focus position to determine whether the gross focus signal increases or decreases. For example, if the gross focus signal increases (decreases) when the focus position moves inwards (outwards), there is a sharp focus position farther from the current focus position. The processor 112, 112', 112" can then provide a focus drive signal to move the focus lens 104 in the direction towards the adjacent sharp focus position.

A focus control system may use the fine focus signal to track an object already in sharp focus to maintain the corresponding image sharp (thus a "tracking mode") despite changes in the scene, movement of the object, or movement of the image pickup apparatus. When an object is in sharp focus, the fine focus signal level is stable despite such changes. Hence a change in the fine focus signal suggests a change in focus distance of the object from the image pickup apparatus. By "locking" the focus control system to a given fine focus signal level near the minimum, for example between 2.0 to 2.5 in this example, in particular 2.1, any shift in the fine focus signal level immediately informs the processor 112, 112', 112" of a change in the focus distance of the object. The processor 112, 112', 112" can then determine a direction and cause the focus lens 104 to move to bring the fine focus signal level back to the "locked" level. Thus the image pickup apparatus 102, 103, 103', 103" is able to track a moving object.

A focus control system, e.g. as implemented in algorithm in processor 112, 112', 112", may use narrow-edge count to trigger a change from a search mode to a tracking mode. In the tracking mode, the focus control system uses the fine focus signal to "lock" the object. Before the focus position is sufficiently near the sharp focus position for the object, the focus control system may use the gross focus signal to identify the direction to move and regulate the speed of movement of the lens. When a object is coming into sharp focus, narrow-edge count peaks sharply. The processor 112, 112', 112" may switch into the tracking mode and use the fine focus signal for focus position control upon detection of a sharp rise in the narrow-edge count or a peaking or both. A threshold, which may be different for each different sharp focus position, may be assigned to each group of objects found from an end-to-end focus position "scan", and subsequently when the narrow-edge count surpasses this threshold the corresponding group of objects is detected. For a stationary scene, e.g. for still image taking, an end-to-end focus position scan can return a list of maximum counts, one maximum count for each peaking of the narrow-edge count. A list of thresholds may be generated from the list of maximum counts, for example by taking 50% of the maximum counts.

Figure 16:
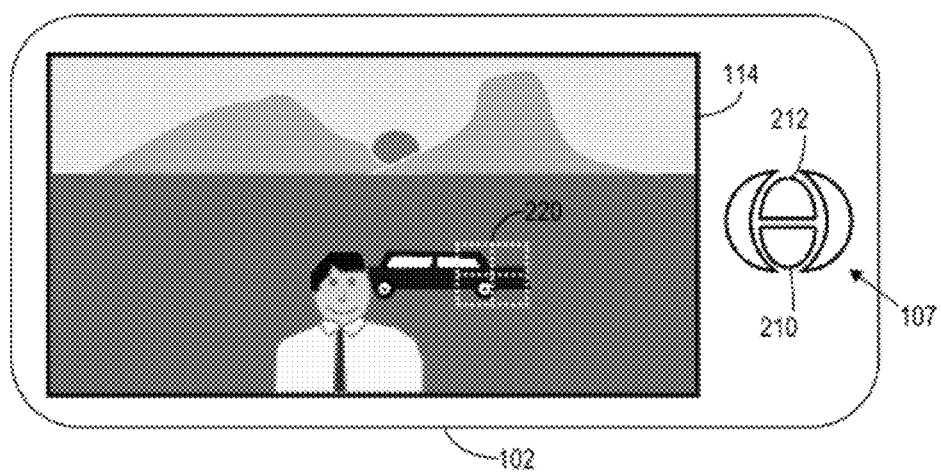
FIG. 16 is an illustration of an apparatus displaying multiple objects in a scene and a selection mark over one of the objects.

FIG. 16 illustrates an image pickup apparatus 102 having a display 114, an input device 107 comprising buttons, and selection marker 1920 highlighted in the display 114. A user can create, shape and maneuver the selection marker 1920 using input device 107. Although shown in this example to comprise buttons, input device 107 may comprise a touchscreen overlaying the display 114 to detect positions of touches or strokes on the display 114. Input device 107 and processor 112, 112', 112" or a separate dedicated controller (not shown) for the input device 107 may determine the selection region. The parameters for describing the selection region may be transmitted to the focus signal generator 120, 120', 120" over bus 132 (or internally within the processor 112 in the case where focus signal generator 120 is part of the processor 112). In response, the focus signal generator 120 may limit the focus signal calculation or the narrow-edge count or both to edges within the selection region described by said parameters or de-emphasize edges outside the selection region. Doing so can de-emphasize unintended objects from the focus signal and then even the gross focus signal will exhibit a single minimum and a minimum level within 1.0 or less of the sharp edge width.

Alternate Embodiments

Figure 17:
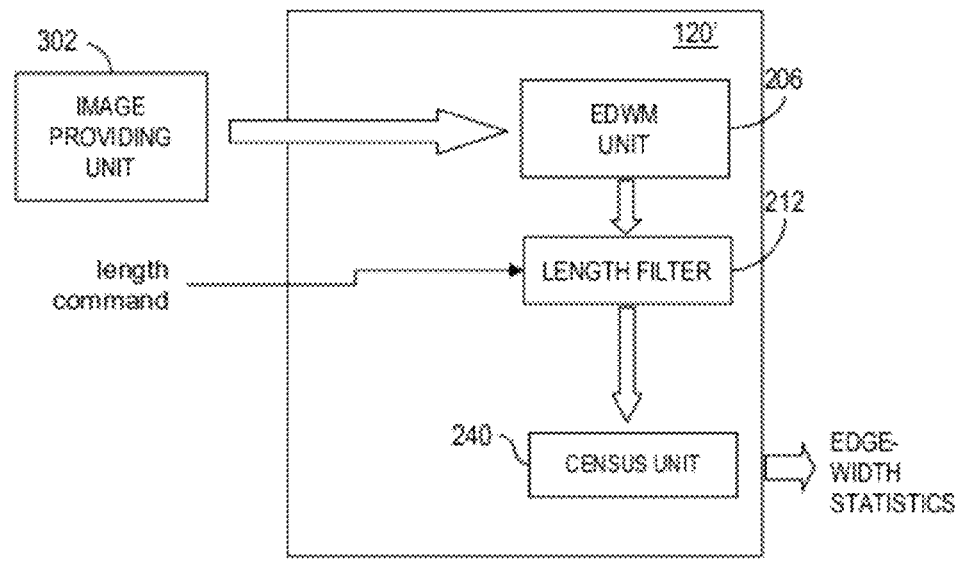
FIG. 17 is a block diagram of an alternate embodiment of a focus signal generator.

FIG. 17 shows an alternate embodiment of a focus signal generator 120'. Focus signal generator 120' outputs statistics of edges and edge widths. Among the edge-width statistics that controller 120' outputs may be one or more of the following: an edge-width histogram comprising edge counts at different edge widths; an edge width where edge width count reaches maximum; a set of coefficients representing a spline function that approximates edge counts at different edge widths; and any data that can represent a function of edge width. Census Unit 240 may receive data computed in one or more of the other units with the focus signal generator 120' to calculate statistics of edge widths. In general, the focus signal generator 120' may output a signal that has an indication of a distribution of edge widths.

Figure 18:
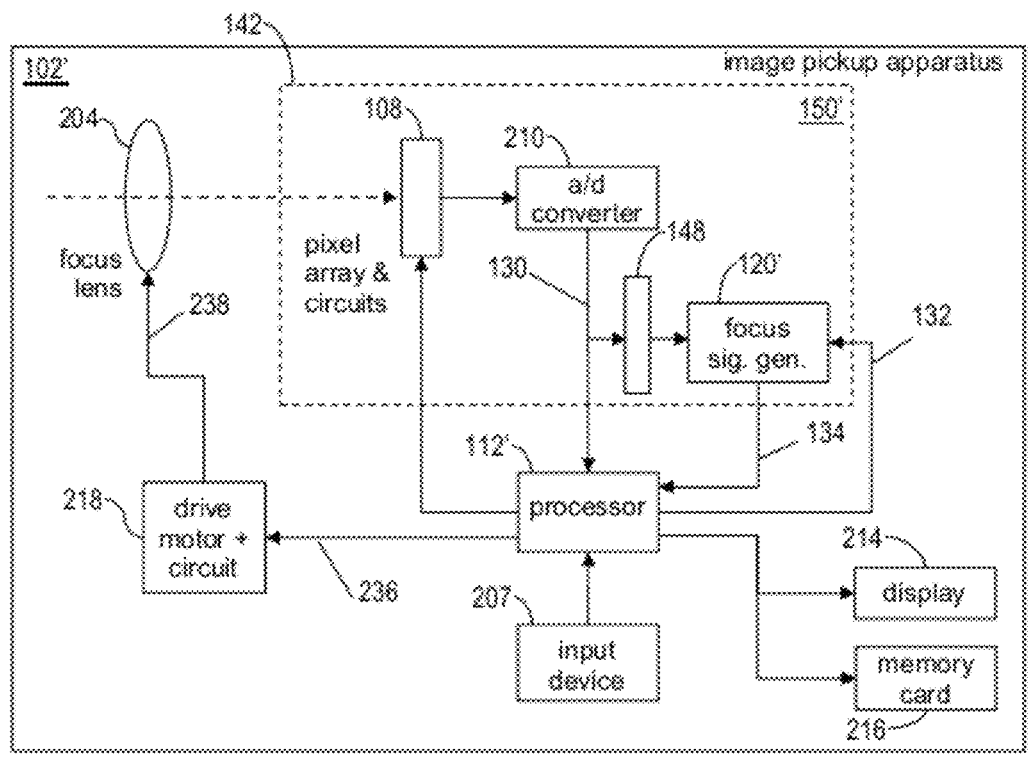
FIG. 18 is a schematic of an alternate embodiment of an auto-focus image pickup apparatus.

Referring to FIG. 18, the edge-width statistics thus provided in signals 134 to an alternative embodiment of processor 112' in an alternative auto-focus image pickup apparatus 102' may be used by the processor 112' to compute a gross and/or fine focus signal and a narrow-edge count in accordance with methods discussed above or equivalent thereof. In addition, any data computed in the focus signal generator 120' may be output to the processor 112' as part of the output signals 134.

The processor 112' may internally generate a focus signal and/or a narrow-edge count in addition to the functions included in the processor 112 of FIG. 1.

The pixel array 108, A/D Converter 110, color interpolator 148, and generator 120' may reside within a package 142, together comprising an image sensor 150', separate from the processor 112'.

Auxiliary Pixel Array

Figure 19:
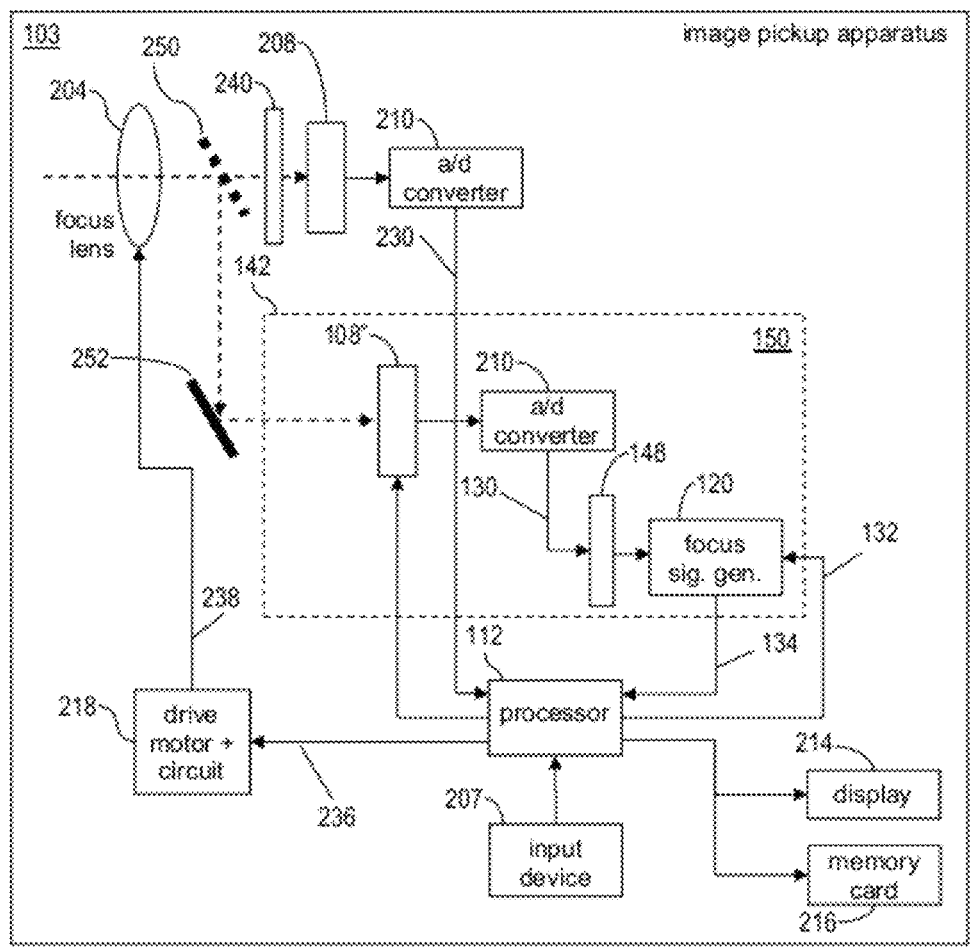
FIG. 19 is a schematic of an embodiment of an auto-focus image pickup apparatus having a main pixel array and an auxiliary pixel array.

FIG. 19 shows an alternate embodiment of an auto-focus image pickup system 103. In addition to elements included in a system 102, the system 103 may include a partial mirror 2850, a full mirror 2852, an optical lowpass filter 2840, a main pixel array 2808, and a main A/D Converter 2810. The partial mirror 2850 may split the incoming light beam into a first split beam and a second split beam, one transmitted, the other reflected. The first split beam may further pass through the optical lowpass filter 2840 before finally reaching the main pixel array 2808, which detects the first split beam and converts to analog signals. The second split beam may be reflected by the full mirror 2852 before finally reaching the auxiliary pixel array 108", which corresponds to the pixel array 108 in system 102 shown in FIG. 1. The ratio of light intensity of the first beam to the second beam may be 1-to-1 or greater than 1-to-1. For example, the ratio may be 4-to-1.

The main pixel array 2808 may be covered by a color filter array of a color mosaic pattern, e.g. the Bayer pattern. The optical lowpass filter 2808 prevents the smallest light spot focused on the pixel array 2808 from being too small as to cause aliasing. Where a color filter of a mosaic pattern covers the pixel array 2808, aliasing can give rise to color moiré artifacts after a color interpolation. For example, the smallest diameter of a circle encircling 84% of the visible light power of a light spot on the main pixel array 2808 ("smallest main diameter") may be kept larger than one and a half pixel width but less than two pixel widths by use of the optical lowpass filter. For example, if the main pixel array 2808 has a pixel width of 4.5 um, whereas the smallest diameter is 2.0 um without optical lowpass filtering, the optical lowpass filter 2840 may be selected to make the light spot 6.7 um or larger in diameter.

The auxiliary pixel array 108" may comprise one or more arrays of photodetectors. Each of the arrays may or may not be covered by a color filter array of a color mosaic pattern. The array(s) in auxiliary pixel array 108" outputs image(s) in analog signals that are converted to digital signals 130 by A/D Converter 110. The images are sent to the focus signal generator 120. A color interpolator 148 may generate the missing colors for images generated from pixels covered by color filters. If auxiliary pixel array 108" comprises multiple arrays of photodetectors, each array may capture a sub-image that corresponds to a portion of the image captured by the main pixel array 2808. The multiple arrays may be physically apart by more than a hundred pixel widths, and may or may not share a semiconductor substrate. Where the pixel arrays within auxiliary pixel array 108" do not share a semiconductor substrate, they may be housed together in a package (not shown).

Main A/D Converter 2810 converts analog signals from the Main Pixel Array 2808 into digital main image data signal 2830, which is sent to the processor 112, where the image captured on the Main Pixel Array 2808 may receive image processing such as color interpolation, color correction, and image compression/decompression and finally be stored in memory card 116.

An array of photodetectors in the auxiliary pixel array 108" may have a pixel width ("auxiliary pixel width") that is smaller than a pixel width of the main pixel array 2808 ("main pixel width"). The auxiliary pixel width may be as small as half of the main pixel width. If an auxiliary pixel is covered by a color filter and the auxiliary pixel width is less than 1.3 times the smallest spot of visible light without optical lowpass filtering, a second optical lowpass filter may be inserted in front of the auxiliary array 108" to increase the smallest diameter on the auxiliary pixel array 108" ("smallest auxiliary diameter") to between 1.3 to 2 times as large but still smaller than the smallest main diameter, preferably 1.5. The slight moiré in the auxiliary image is not an issue as the auxiliary image is not presented to the user as the final captured image.

Figure 22:
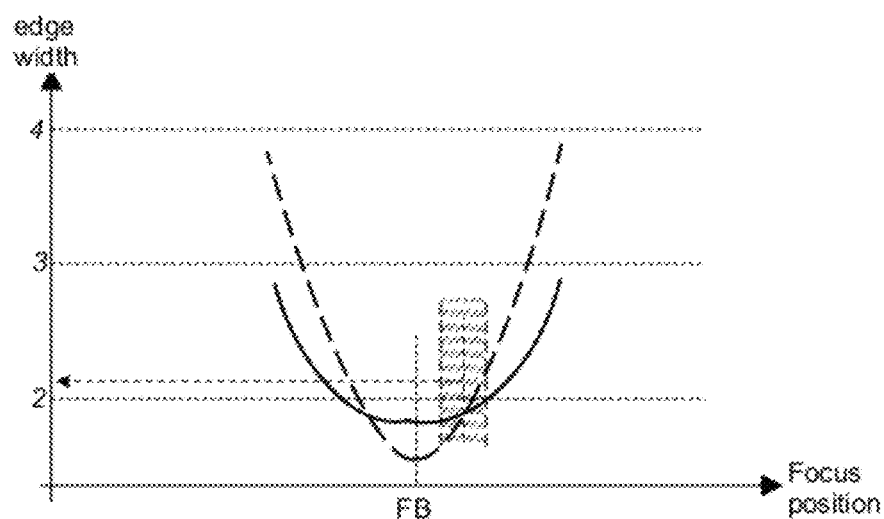
FIG. 22 is an illustration of a variation of an edge width from a main pixel array and a variation of an edge width from an auxiliary pixel array at different focus positions.

FIG. 22 illustrates how edge widths may vary about a sharp focus position for main images from the main pixel array 2808 (solid curve) and auxiliary images from the auxiliary pixel array 108" (dashed curve). The auxiliary images give sharper slopes even as the main images reach the targeted sharp edge width of 2. The auxiliary image is permitted to reach below the targeted sharp edge width, since moiré due to aliasing is not as critical in the auxiliary image, as it is not presented to the user as a final image. This helps to sharpen the slope below and above the sharp edge width. The sharper slope is also helped by the auxiliary pixel width being smaller than the main pixel width.

The shaded region in FIG. 22 indicates a good region within which to control the focus position to keep the main image in sharp focus. A change in focus position outwards will cause the edge width to increase in the auxiliary image, whereas a change inwards will cause the it to decrease. To maintain the main image's edge widths near the sharp edge width, a linear feedback control system may be employed to target the middle auxiliary edge width value within the shade region and to use as feedback signal the edge widths generated from the auxiliary images.

The auxiliary pixel array 108", A/D Converter 110, focus signal generator 120 together may be housed in a package 142 and constitute an auxiliary sensor 150. The auxiliary sensor 150 may further comprise a color interpolator 148.

Figure 20:
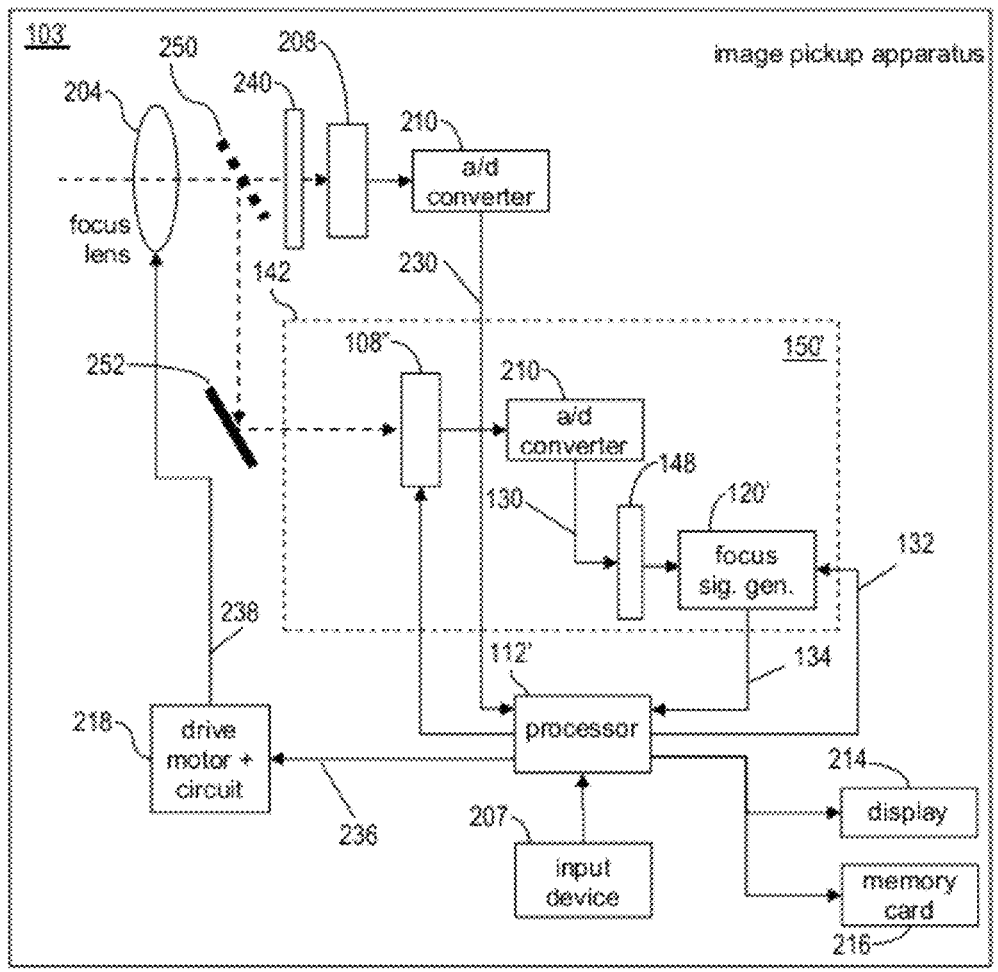
FIG. 20 is a schematic of an alternate embodiment of an auto-focus image pickup apparatus having a main pixel array and an auxiliary pixel array.

FIG. 20 shows an alternative embodiment of auto-focus image pickup apparatus 103' similar to apparatus 103 except focus signal generator 120' replaces focus signal generator 120. The auxiliary pixel array 108", A/D Converter 110, focus signal generator 120' together may be housed in a package 142 and constitute an auxiliary sensor 150'. The auxiliary sensor 150 may further comprise a color interpolator 148.

Figure 21:
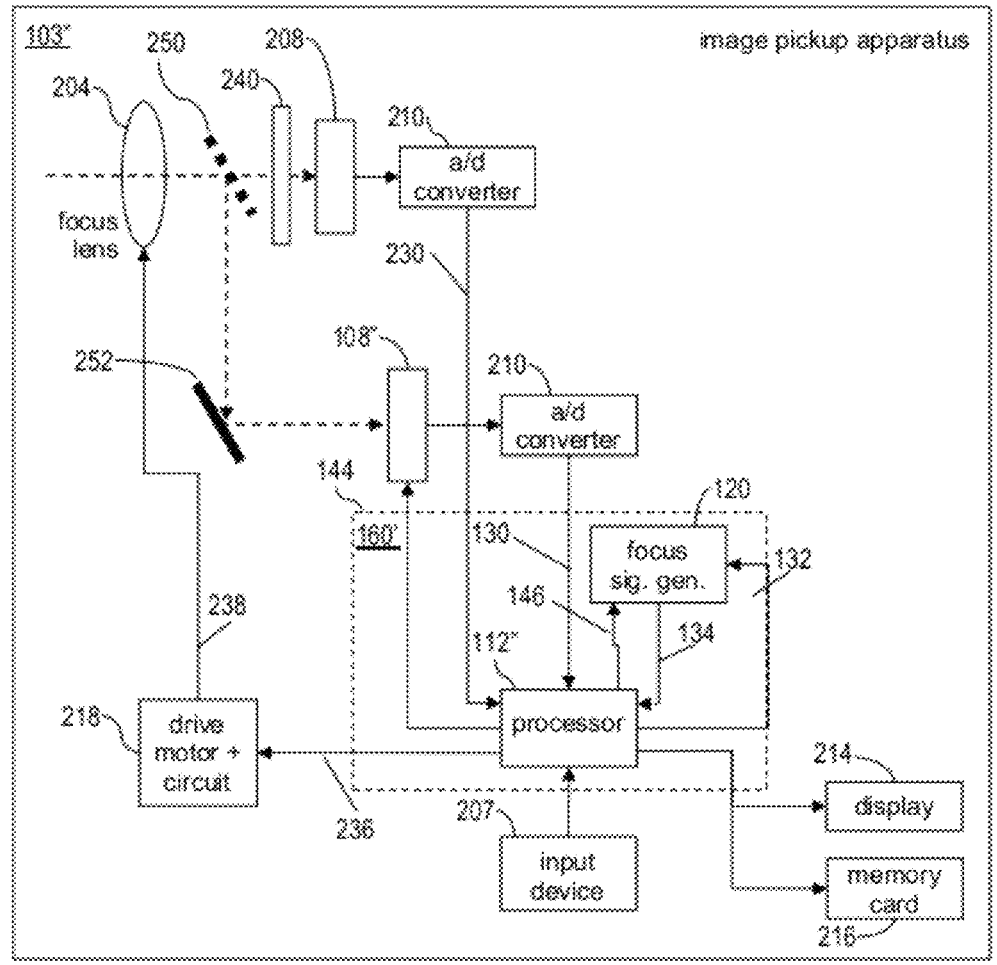
FIG. 21 is a schematic of an alternate embodiment of an auto-focus image pickup apparatus having a main pixel array and an auxiliary pixel array.

FIG. 21 shows an alternate embodiment of auto-focus image pickup apparatus 103". The focus signal generator 120 and the processor 112" may be housed in a package 144 as a camera controller, separate from the auxiliary pixel array 108". The processor 112" is similar to processor 112 except that processor 112" receives images from the main pixel array 2808 as well as the auxiliary pixel array 108". The processor 112" may perform a color interpolation, a color correction, a compression/decompression, and a storing to memory card 116 for the images received on signal 2830 similar to the processing that the processor 112 may perform on signal 130 in FIG. 2. Unlike in FIG. 2, here the images received on signal 130 need not receive compression/decompression and storing to memory card 116. The processor 112" may perform color interpolation on images received on signal 130 for pixels that are covered by color filters in the auxiliary pixel array 108" and send the color interpolated images to the focus signal generator 120 on signal 146.

The auto-focus image pickup system 102, 102', 103, 103', 103" may include a computer program storage medium (not shown) that comprises instructions that causes the processor 112, 112', 112" respectively, and/or the focus signal generator 120, 120' to perform one or more of the functions described herein. By way of example, the instructions may cause the processor 112 or the generator 120' to perform a slant correction for an edge width in accordance with the flowchart of FIG. 7. As another example, the instructions may cause the processor 112' or the generator 120 to perform an edge width filtering in accordance with the above description for Width Filter 209. Alternately, the processor 112, 112' or the generator 120, 120' may be configured to have a combination of firmware and hardware, or a pure hardware implementation for one or more of the functions contained therein. For example, in generator 120, a slant correction may be performed in pure hardware and a length filter 212 performed according to instructions in a firmware.

Figure 26:
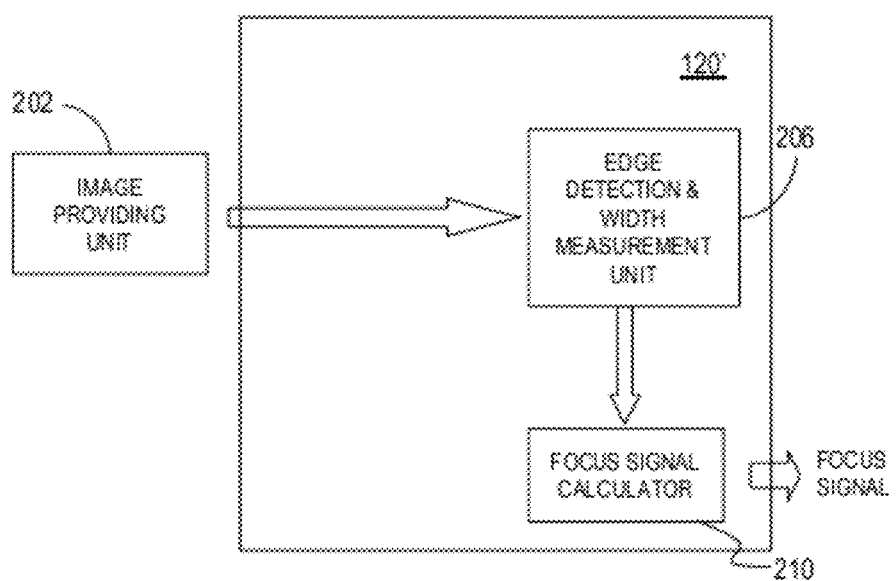
FIG. 26 shows an alternate embodiment of a focus signal generator.

FIG. 26 shows yet another embodiment of focus signal generator 120'. This embodiment may be employed in any of the above image capture systems.

While a memory card 116 is shown as part of system 102, any nonvolatile storage medium may be used instead, e.g. hard disk drive, wherein images stored therein are accessible by a user and may be copied to a different location outside and away from the system 102.

One or more parameters for use in the system, for instance the sharp_edge_width, may be stored in a non-volatile memory in a device within the system. The device may be a flash memory device, the processor, or the image sensor, or the focus signal generator as a separate device from those. One or more formulae for use in the system, for example for calculating the concatenated length threshold, or for calculating beta may likewise be stored as parameters or as computer-executable instructions in a non-volatile memory in one or more of those devices.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

The invention claimed is:

1. A method for evaluating a degree of sharpness of an image on basis of a plurality of edges within said image, comprising:
   curve-fitting a gradient profile of an edge among said plurality of edges with a sequence of two or more reference gradients, among which at least two reference gradients have different gradient values;
   performing a comparison of said sequence with said gradient profile by a circuit; and,
   de-emphasizing said edge or rejecting said edge altogether on basis of a result of the comparison from entering a calculation for said degree of sharpness.

2. The method of claim 1, wherein said degree of sharpness is a quantity whose unit is a positive or negative, integer or non-integer power of a unit of length, given that each image sample has a unit of energy and distance between any two image samples has a unit of length.

3. An image capture apparatus, comprising:
   a focus lens;
   a pixel array configured to receive light passing through the focus lens to form an image on the pixel array; and,
   a focus signal generator configured to generate a signal from a plurality of edges to indicate a degree of sharpness of the image, the focus signal generator comprising:
      a sequence generator configured to output a sequence of reference gradients for an edge;
      an evaluation unit configured to perform a comparison between the sequence and a gradient profile of the edge; and,
      a signal calculator configured to calculate the signal with the edge being de-emphasized or rejected on basis of a result of the comparison.

4. The image capture apparatus of claim 3, wherein said degree of sharpness is a quantity whose unit is a positive or negative, integer or non-integer power of a unit of length, given that each image sample has a unit of energy and distance between any two image samples has a unit of length.

* * * * *